United States Patent [19]
Wolrich et al.

[11] Patent Number: 6,131,107
[45] Date of Patent: *Oct. 10, 2000

[54] FAST DETERMINATION OF CARRY INPUTS FROM LOWER ORDER PRODUCT FOR RADIS-8 ODD/EVEN MULTIPLIER ARRAY

[75] Inventors: Gilbert M. Wolrich, Framingham, Mass.; Sribalan Santhanam, San Carlos, Calif.; Andrew S. Olesin, Princeton, Mass.

[73] Assignee: Digital Equipment Corporation, Houston, Tex.

[ * ] Notice: This patent is subject to a terminal disclaimer.

[21] Appl. No.: 09/208,169

[22] Filed: Dec. 9, 1998

Related U.S. Application Data

[63] Continuation of application No. 08/938,951, Sep. 18, 1997, which is a continuation of application No. 08/526,255, Sep. 11, 1995, Pat. No. 5,729,485.

[51] Int. Cl.$^7$ ........................................................ G06F 7/52
[52] U.S. Cl. ........................... 708/630; 708/628; 708/620
[58] Field of Search ........................... 708/620, 625–628, 708/629–631, 551, 497, 499, 503

[56] References Cited

U.S. PATENT DOCUMENTS

| | | | |
|---|---|---|---|
| 4,229,800 | 10/1980 | Gregorian et al. | 364/745 |
| 4,748,582 | 5/1988 | New et al. | 364/754 |
| 4,982,355 | 1/1991 | Nishimura et al. | . |
| 5,119,325 | 6/1992 | Viot et al. | 364/760 |
| 5,251,167 | 10/1993 | Simmonds et al. | . |
| 5,260,889 | 11/1993 | Palaniswami | 364/745 |
| 5,262,976 | 11/1993 | Young et al. | 364/760 |
| 5,426,599 | 6/1995 | Machida | 364/760 |
| 5,434,809 | 7/1995 | Taniguchi | 364/752 |
| 5,444,647 | 8/1995 | Komoda | . |
| 5,500,812 | 3/1996 | Saishi et al. | 364/745 |
| 5,506,799 | 4/1996 | Nakao | 364/760 |
| 5,521,855 | 5/1996 | Yamasaki | 364/760 |

*Primary Examiner*—Tan V. Mai
*Attorney, Agent, or Firm*—Hamilton, Brook, Smith & Reynolds, P.C.

[57] ABSTRACT

A multiplier in a floating point processor includes a circuit to determine for each bit of the multiplier operand a 3 times booth recode and a booth recode multiplier array which implements a 3 times booth recode multiplication. The multiplier includes logic to determine a fast sign extend to replace bit positions shifted in the array as well as a rounding adder to provide a rounded result while determining the final result from the booth recode multiplier. The multiplier also includes a circuit to determine a contribution to the final multiplication result from a lower order product with out forming the entire product.

18 Claims, 14 Drawing Sheets

FAST DETERMINATION OF CARRY INPUTS FROM LOWER ORDER PRODUCT FOR RADIS-8 ODD/EVEN MULTIPLIER ARRAY

This application is a continuation of co-pending U.S. application Ser. No. 08/938,951, which was filed on Sep. 18, 1997 which is a continuation of U.S. application Ser. No. 08/526,255, filed Sep. 11, 1995, which issued as U.S. Pat. No. 5,729,485 on Mar. 17, 1998, the teachings of which are incorporated herein by reference in their entirety.

BACKGROUND OF THE INVENTION

This invention relates generally to floating point processors used in computers and more particularly to a method and apparatus to multiply floating point numbers.

As it is known in the art, many applications in computers require the use of numbers that are not integers. There are several ways in which nonintegers can be represented in computers. The most common approach is the so-called floating-point representation in which a number is divided into separate sections. One section of a floating-point number is referred to as a fraction which represents the precision of the number and the another section is referred to as an exponent. A third section is a bit for the sign of the number or operand.

One operation commonly performed in floating-point processors is the multiplication of two floating-point numbers. One approach used to multiply two floating-point numbers is to provide the floating-point numbers i.e. multiplicand and multiplier to a multiply array comprising a plurality of rows of carry-save adders which determine partial products of the multiplication operation in redundant form. The result of each row of the array is a sum and a carry vector which is shifted prior to being combined with a more significant sum and carry vector in the next row of the array. The sum is shifted by M positions in order to align the sum vector with the next sum vector while the carry vector is shifted by M-1 positions. After the resulting carry vectors and sum vectors propagate to each of the rows of the array, a final carry vector and sum vector are provided from the last row of the array. To obtain the final result, the final sum and carry vectors are added together to provide the product of the multiplication operation. A floating point multiplication of two floating point operands, each with N bits, produces a result of 2N bits of fraction. The desired result is the product normalized such that the fraction is between one-half and one and then correctly rounded to N fraction bits. Since the least significant N bits of the full product are not included in the fraction results, the width of the multiplier might need only to be n+2 bits wide. The additional two bits accounts for rounding bits for the fraction results greater than one-half and less than one-half so long as the contributions are partial product bits in the n −2 least significant bit positions to the n+2 most significant bit positions is included.

One problem that exists, therefore, is in not duplicating the entire multiplier array for the lower N−2 bits of the multiplication result since such a duplication in the multiplier array will reduce the speed of the multiplication operation and will require a large amount of logic circuits to implement.

It is also known that there are techniques for reducing the size of the multiplier array particularly with respect to the most significant bits of the result. So-called "booth" coding is often used in order to reduce the total number of partial products and resulting summations which must be performed on a multiplication of two floating-point operands. By reducing the partial products which are summed such as with an odd-even booth encoding scheme, the number of carry-save adder delays need to determine the product are concomitantly reduced, but it is necessary, nevertheless, to account for the product data which is shifted off the array in order to determine what contribution, if any, to the final rounding result would be made by the lower order bits of the lower order product.

One technique known to account for a contribution from the lower order product used on the Alpha 21064 microprocessor manufactured by Digital Equipment Corp. assignee of the present invention, uses a half adder to add two of the initial partial products in the first row of the multiplier array. The sum and carry from the half adder in the multiplier array as well as bits of the initial partial products were fed to a lower order array of two levels of carry-save adders and carry chain. This solution had some drawbacks since it required an extra row of carry save adder delay because only two initial partial products are summed by the initial half adder. This increases the overall propagation length of the array and thus reduces performance.

SUMMARY OF THE INVENTION

In accordance with the present invention, an apparatus for determining a contribution to a multiplication result from a lower order product includes for each row of a corresponding multiplier array includes a half adder fed by partial product bits from a multiplier array, means, responsive to sums and carrys from the half adder, for producing a sum and a carry vector for the corresponding row of the multiplier array. The apparatus further includes means, responsive to a carry out for a one of said groups preceding a last one of said groups, for combining a last one of the sum and carry vectors corresponding to a last one of the rows of the multiplier array to provide the contribution to the multiplication product from the lower order product. With such an arrangement by providing a half adder in an array which determines a contribution to a multiplication result from a lower order product, the half adder can be eliminated from the multiplier array of a multiplier and thus inproves the performance of the multiplier array by reducing the propagation delay therethough. The extra propagation delay provided in the array for the lower order product does not significantly determine performance since the multiplier array itself determines the overall system performance.

BRIEF DESCRIPTION OF THE DRAWINGS

The foregoing features and other aspects of the invention will now become apparent when viewed with the accompanying description taken in conjunction with the accompanying drawings in which.

DESCRIPTION OF PREFERRED EMBODIMENTS

Introduction

Figure 1:
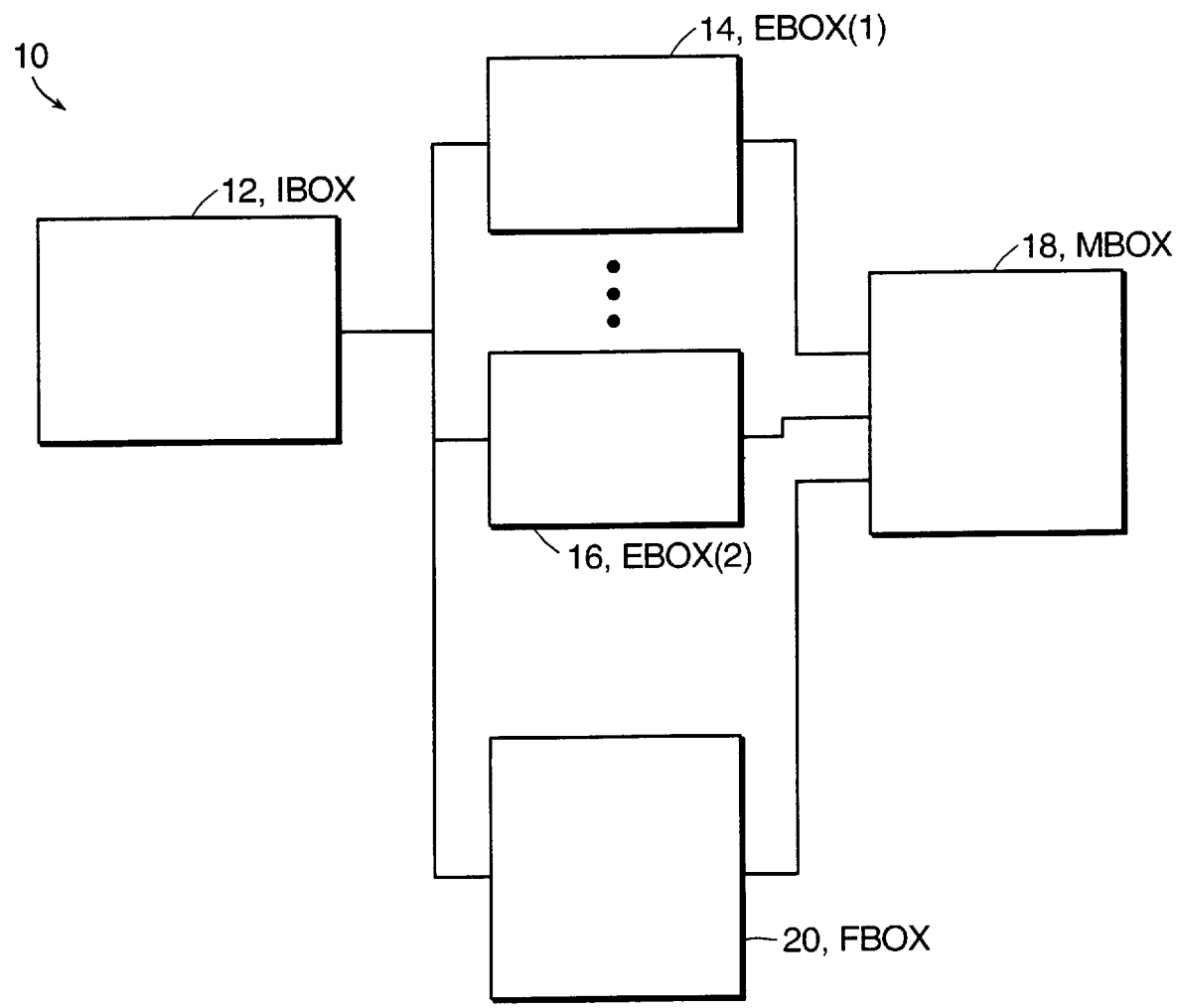
FIG. 1 is a simplified block diagram of a microprocessor.

Referring now to FIG. 1, a processor 10 is shown to include an IBOX 12 that is an instruction issue box which issues instructions fetched from a memory (not shown) to a plurality of execution boxes here two integer, execution boxes 14, 16, as shown, or to a floating point processor execution box 20. An MBOX 18 that is a memory management control box determines the physical memory address for instruction and data fetches to memory. The execution boxes 14, 16, 20 include arithmetic logic units (not shown) and general purpose register files (not shown). Results stored in the general purpose register files from each of the execution boxes are written to a memory box 18 which also includes data caches, write buffers, memory management and datapath to memory as well as other circuits as necessary to interface the processor to memory (not shown).

Illustratively, the processor 10 is of a RISC (reduced instruction set computer) architecture, or alternatively could be a CISC (complex instruction set computer) architecture. Moreover, the processor 10 includes the instruction box 12 which has the capability of issuing four instructions per issue cycle. Two of those instructions can be floating-point instructions which are sent to the FBOX 20 whereas the other two of the instructions can be integer or memory reference instructions which are issued to EBOX 14 and EBOX 16 or to the MBOX 18.

Add and Mul Pipes

Figure 2:
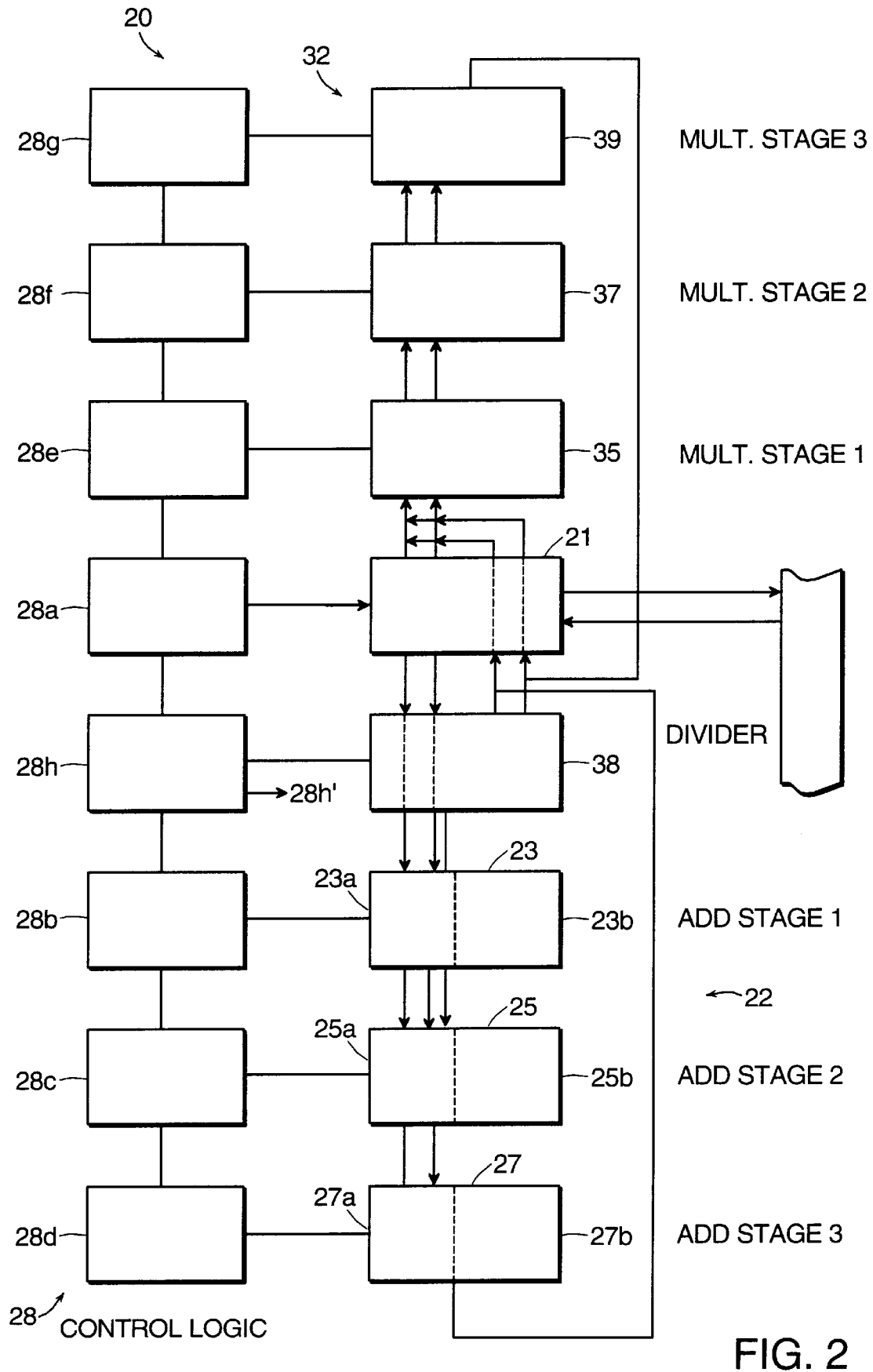
FIG. 2 is a block diagram of a floating point execution box used in the microprocessor of FIG. 1.

Referring now to FIG. 2, the floating-point execution box 20 is shown to include a register file 21 and control logic 28a–28h. The control logic 28a–28h is responsive to floating-point instructions provided from the IBOX 12 and provides control signals to each stage of an addition/subtraction pipe 22 and multiply pipe 32 as shown. The control logic stages 28a to 28h also provide control signals to store and load register contents from the register file 21 to/from the addition/subtraction pipe 22 and the multiplier pipe 32 as shown.

The control logic also processes a sign bit for calculations in the add pipe and multiply pipe. There is a circuit which in accordance with the instruction and the relative magnitude of the operands forms a sign bit S.

The addition/subtraction pipe 22 is comprised of three stages used to provide a floating point addition or subtraction and a stage to provide a floating point division. The addition/subtraction function is provided in pipeline stages 23, 25, and 27. Add stage 23 (ADD STAGE 1) is used to provide a normalization shift prediction for the operands and to adjust the operands to ensure that the exponents are the same for addition/subtraction operations. The adder stage 25 (ADD STAGE 2) implements either an alignment shift or the normalization shift as determined in stage 1 and detects and provides a prediction for a sticky bit. The sticky bit is determined by examination of the input operands by use of trailing zero detectors and a carry save adder (not shown). An example of a sticky bit prediction circuit is described in U.S. patent application Ser. No. 08/833,310 by Gilbert Wolrich et. al. entitled Fast Determination of FP Sticky Bit from Input Operands, and assigned to the assignee of the present invention incorporated herein by reference.

The adder stage 27 (ADD STAGE 3) performs the addition or effective subtraction on a pair of operands provided from stage 2 and also provides a rounded normalized result for those operations. That is the rounding operation is automatically performed by a rounding adder in stage 3 during the addition/subtraction of the input operands A and B in accordance with the rounding mode determined by the floating point instruction.

Each of the add stages 23, 25 and 27 have a portion respectively 23a, 25a and 27a which is used to calculate the fractional part of the resulting addition or subtraction operation, and a portion 23b, 25b and 27b which is used to calculate the exponent portion of the resulting operation The results from the add or effective subtraction operation. which are calculated in stage 3 are fed back to the register file 21 for storage in the appropriate floating-point register in accordance with the destination specified in the instruction. Stage 23 of the add pipe 22 requires one cycle, stage 25 requires 1.5 cycles and stage 27 requires 1.5 cycles for execution. In the add pipe the cycles are referenced as cycles 5, 6, 7 and 8 with each cycle having two phases 5A, 5B; 6A, 6B; 7A, 7B and 8A, 8B.

The multiply pipe 32 includes three stages 35, 37 and 39 with each stage being broken into fractional or mantissa portions 35a to 39a and exponent portions 35b to 39b. The first multiply stage 35 includes an adder used to produce a multiple of three times the multiplicand operand. Multiply stage 1 (35) also determines the booth recoding of the multiplier necessary to select the partial products to be summed in stage 2 (37) of the multiply pipe, and the number of trailing zeroes in both the multiplicand and the multiplier in order to calculate the sticky bit for multiplication. Multiply pipe stage 2 (37) includes an array of partial product selectors and carry save adders which determines the product in redundant form, i.e. a sum binary number and carry binary number which when added result in a single binary number. Multiply pipe stage 39 determines the result by adding the sum and carry output with the rounding mode and sticky bit signals. The sticky bit signals are produced by an arrangement similar to that described in the above mentioned application.

Data Path Alignment

Figure 3:
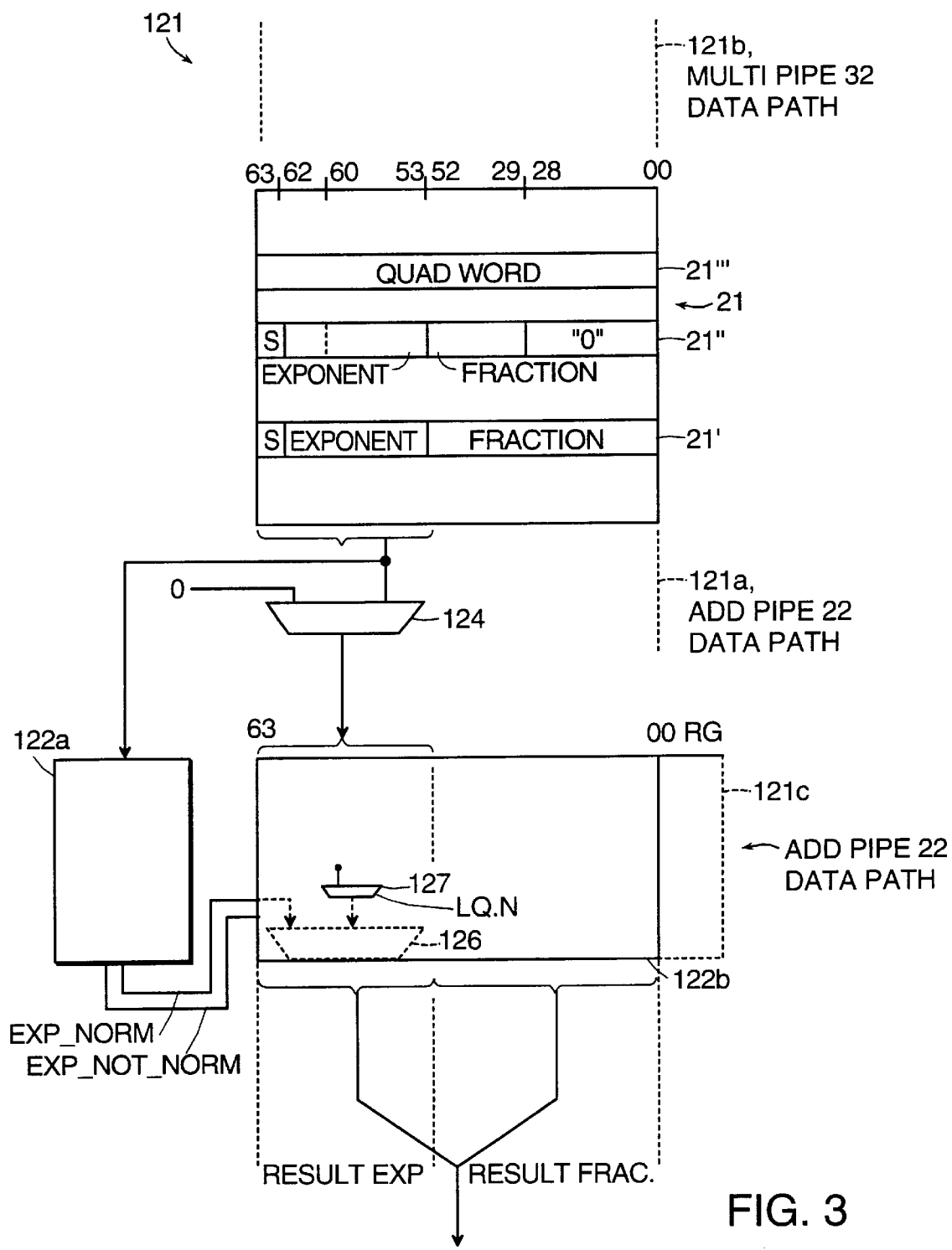
FIG. 3 is a block diagram of a portion of a data path of the floating point processor of FIG. 2 including a register file.

Referring now to FIG. 3, a portion of the data path 121 in the floating point processor (20 FIG. 1) is shown. The data path 121 has a add pipe portion 121a and an multiply pipe portion 121b with the register file 21 coupled between the multiply and add pipes as shown.

The data path 121a of the add pipe 22 is shown divided into three sections: a sign/exponent section 122a, a fraction section 122b, and a round/guard bit section 122c. As also shown, the register file 21 can store or deliver data with several different formats. One pair of formats is for single and double precision floating point numbers and the other pair is for long and quad word integers.

For a double precision floating point number, the fractional part of the number occupies bit positions 00 to 51, with the exponent portion occupying bit positions 52 to 62 and the sign occupying bit position 63, as illustrated by entry 21' in register file 21. For a single precision the fractional part occupies bit positions 29 to 51 and the exponent is expanded to 11 bits and occupies bit positions 52 to 62 The sign bit occupies bit position 63 as illustrated by entry 21''. For floating point single precision the exponent is expanded from 8 bits in memory format to 11 bits in register format. Register format is provided by inserting the MSB of the exponent into bit position 62, and the complement of the exponent MSB into bit positions <61:59>, unless all of the bits are zero in which case zeros are filled in. For single precision fraction bit positions <28:0> are zeroed.

The fraction bit 00 or LSB in the register file is aligned with the data bit position 00 or LSB in the data path, as is each succeeding bit in the fraction. The exponent and sign bit positions are coupled to the bit positions in the exponent/sign portion 121a of the data path 121, as shown. Multiplexer 124 is used to place a one into bit position 52 (the hidden bit) and zeros into bit positions 53 to 63 for floating point operations while the sign and exponent portions of a floating point number are fed to the exponent/sign portion 122a of the data path 121.

For conversions from quad or long words to floating point the bits are aligned directly such that bit position 00 goes to bit position 00 in the data path and bit positions 52 to 63 go to data path positions 52 to 63 via multiplexer 124. At the end of the add pipe data path portion 121a is a second multiplexing function 126 which is here built into the add pipe round adder of the last stage of the add pipe. Alternatively, a separate multiplexer can be used. This second multiplexing function permits the exponent and sign data to be concatenated with the fraction data and stored back into the register file 21 as an entry similar to 21' or 21''.

For integer operand types (Q or L words) multiplexer 126 provides the more significant bits of the result as described below. Thus, the second multiplexing function 126 can select either bits from the round adder (stage 3) for integers or an exponent provided as a result of a normalized operation or an exponent provided from a non-normalized operation for floating point numbers. A small multiplexer 127 is provided at the bit positions <62:59> to select between L (longword) and Q (quadword destination formats. For Q destination types the round adder bits pass directly through multiplexer 127, but for L type destinations round adder output 60 is driven to mux bit 62 and mux bits <61:59> are zeroed.

For a quad word as illustrated by 21''', the quad word occupies bit positions 00 to 63, as shown. The data from the register file 21 is aligned with the positions in the data path. Thus bit position 00 in the register file occupies bit position 00 in the data path and bit position 63 in the register file occupies bit position 63 in the data path. With quad words the integer result is selected in multiplexer 126.

The data path also include two additional bit positions. One of the positions is for a round bit (R) or one bit position less significant than the LSB of a data word which here is bit position 00 (which is also referred to herein as the context indicates as the L bit). The second additional bit position is for a guard bit (G) or two bit positions less significant than the LSB of a data word. As used herein there is a K bit which is one bit position more significant than the LSB or L bit position. The K, L, R, and G bit positions are extensively referred to hereinafter particularly with respect to the Sticky bit logic and the rounding adder.

With the above alignment of the register file and the data path the extra formatting generally required in prior approaches is eliminated. Thus, the propagation delay inherent with prior approaches is reduced and the amount of chip area required for data type formatting multiplexers is reduced. Moreover, the arrangement still provides the capability of maintaining bit positions beyond the LSB bit position of the data path.

For the multiply pipe the fraction bit B52 or LSB in the register file is aligned with the LSB data bit position in the data path, as is each succeeding bit in the fraction such that the fraction bits B52 to B1 occupy bit positions <0:51>. The exponent is eleven bits wide <10:0> and occupies bit positions <62:52> and are coupled to the bit positions in the exponent portion 121 a of the data path 121, as shown. The hidden bit B0 is not stored, and the sign bit position is bit position 63. The register file Bit 64 also sets a zero bit if all bits not considering the sign bit are zero. The arrangement is similar to that for the add pipe except there is no need for the multiplexers since the multiple pipe does not perform conversion operations.

Mul Pipe

Figure 4A:
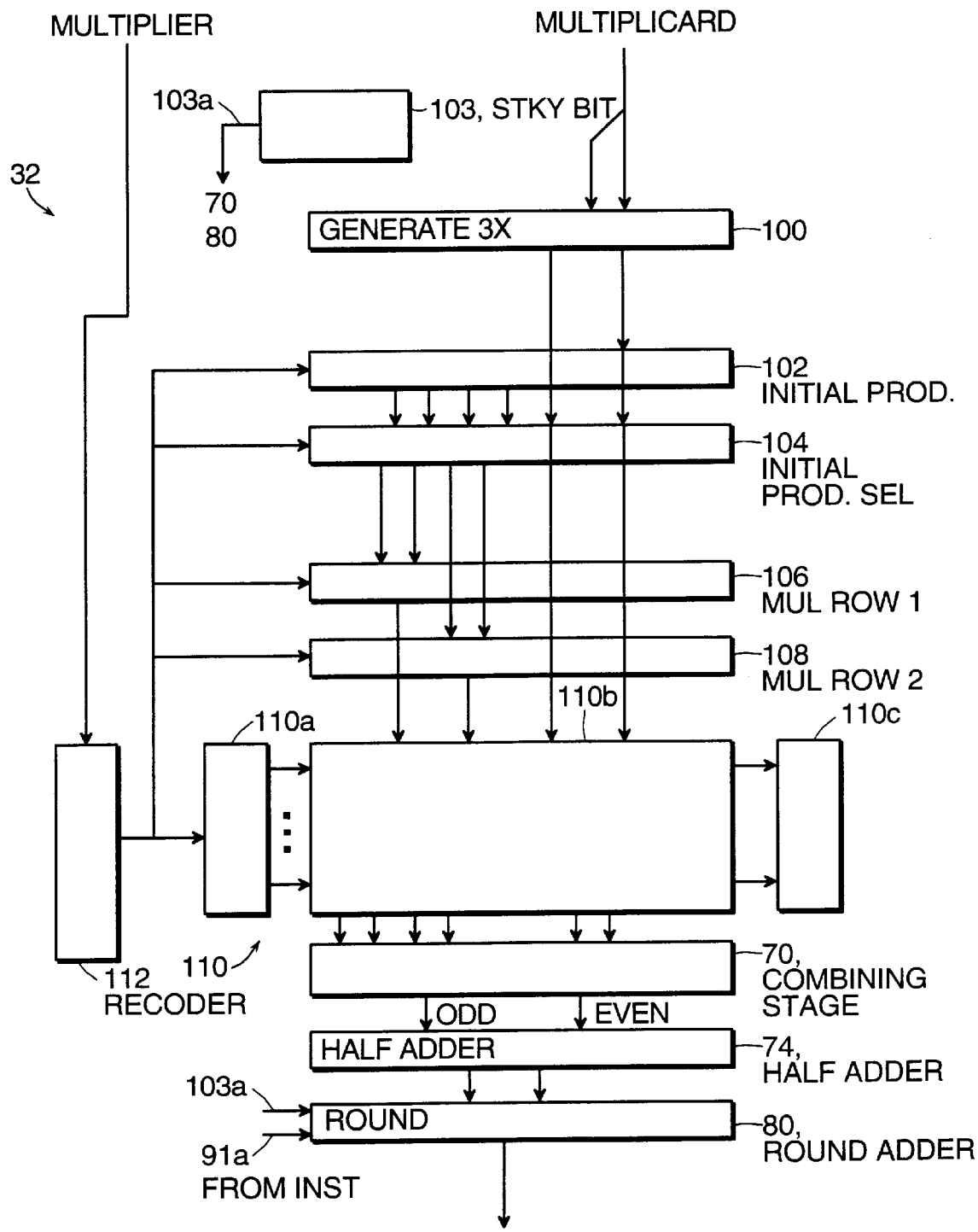
FIG. 4A is a block diagram of a multiply pipe used in the floating-point processor of FIG. 2.
Figure 4B:
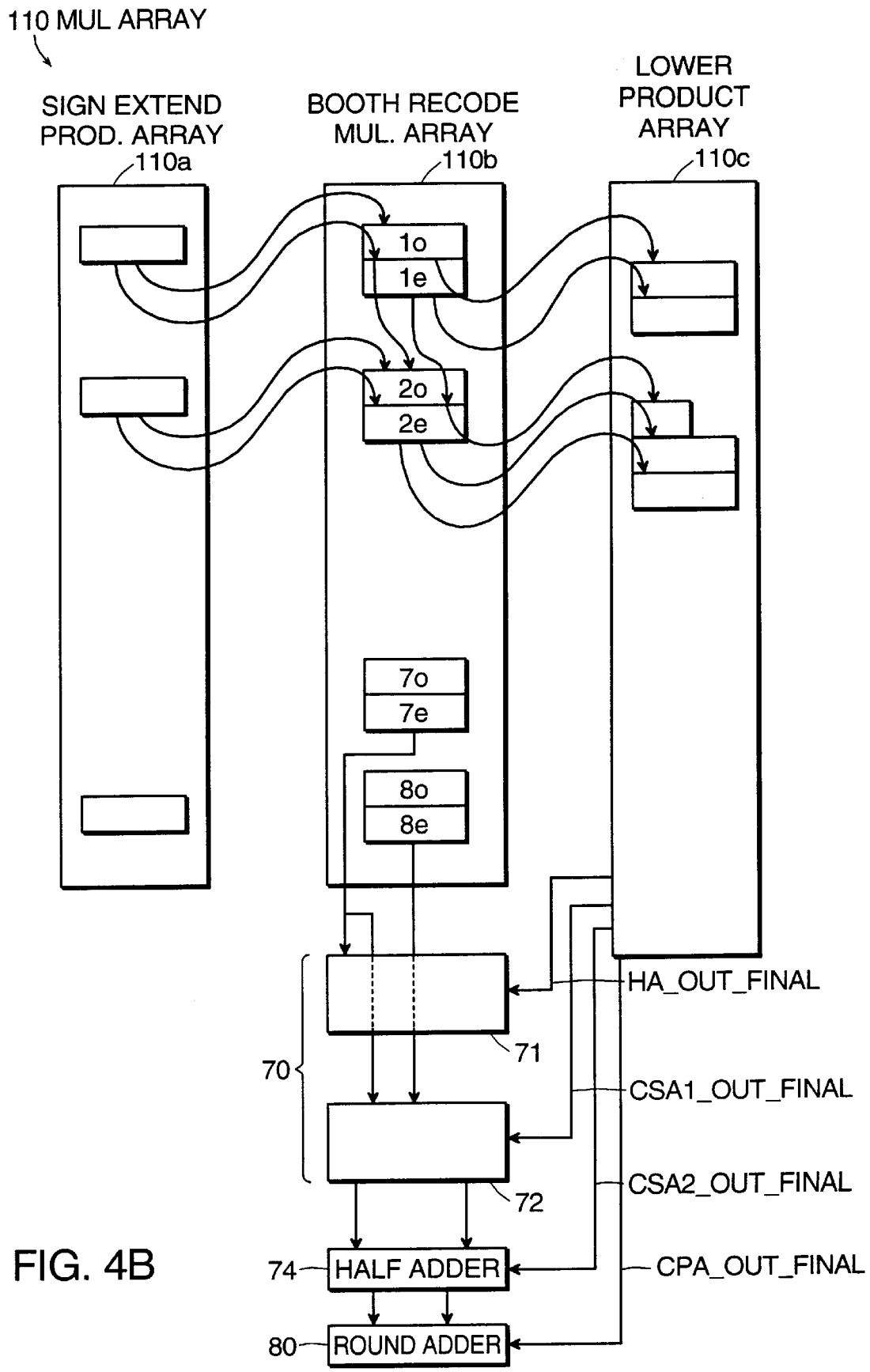
FIG. 4B is a block diagram of a booth recode multiplier of the floating point processor of FIG. 4.

Referring now to FIG. 4 the multiplier (mul) pipe stage 32 is shown to include a 56 bit fractional adder 100 used to precompute here 3 times the multiplicand. The multiplier 32 here implements a radix 8 or 3 bit booth recoding algorithm which looks at four bits of the multiplier at a time. The adder 100 and selector banks 102 and 104 set up the initial partial products for the first row of a Radix 8 recode multiplier array 110b. The Radix 8 recode multiplier array 110b is part of a multiplier array 110 which includes a sign extension array 110a and a lower product array 110c. The Radix 8 recode multiplier array 110b receives the initial partial products and uses them to perform weighted additions in parallel on odd and even threads of the multiplicands. The products obtained in each stage are in sum and carry vector form. The sum and carry outputs from the odd and even threads are combined in two levels of carry save adders to produce a final sum carry and final carry vector.

The carry and sum vectors from the final stage of the Radix 8 multiple array are passed to a combining stage 70a which produces a final odd and even vector for a half adder 74. The half adder 74 is used for multiplication operations to propagate a carry out of the guard bit positions. The half adder 74 produces sum and carries for each bit position. The outputs from the right shift circuit 72 and half adder 74 are fed to round adder 80. This simplifies LRG logic (which is used to add the LSB "L", the round bit "R" and the guard bit "G") in the round adder 80 without any cost in pipeline cycle period while permitting the LRG logic to be faster.

Figure 8:
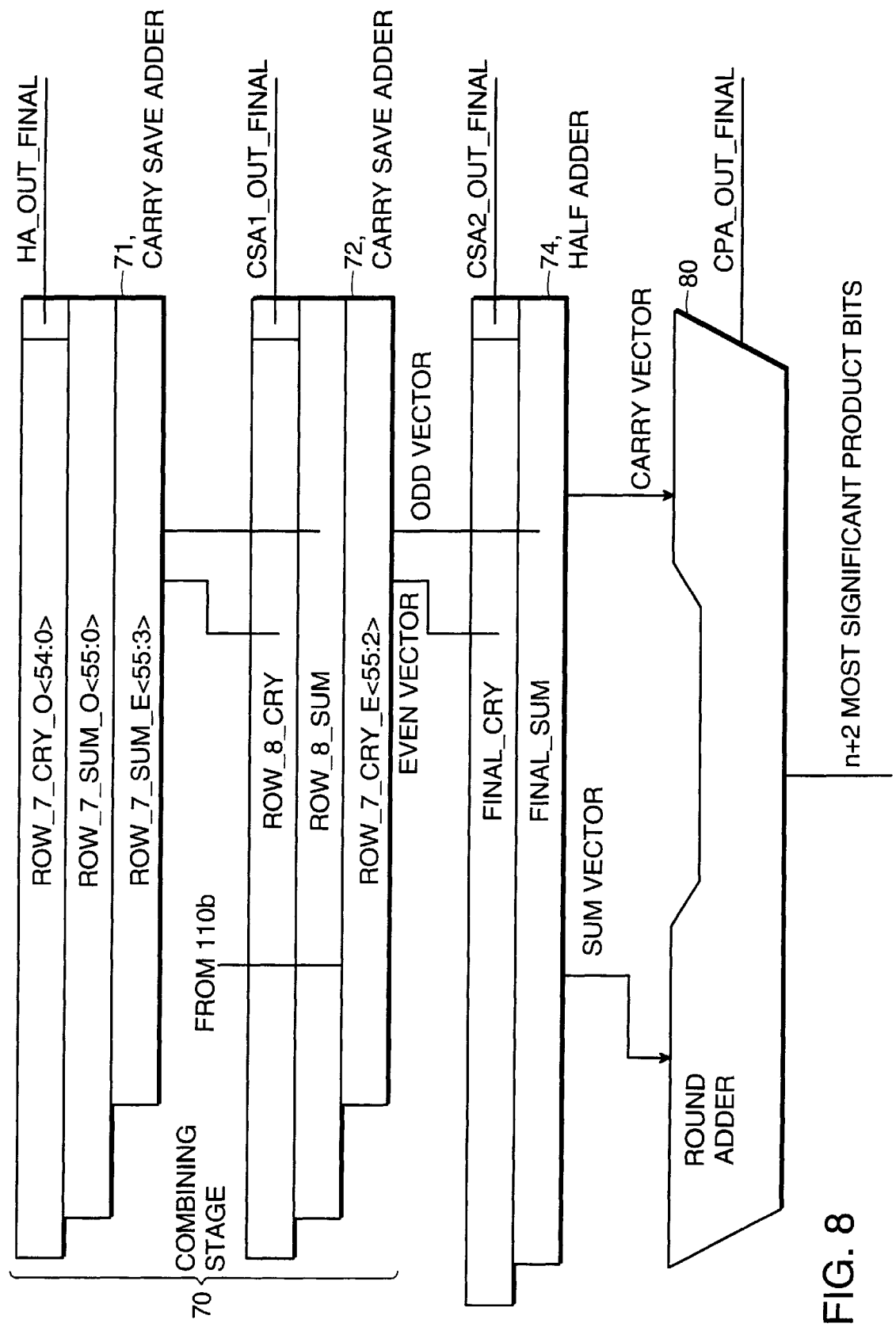
FIG. 8 is a block diagram showing the last several stages of the multiplication array and the arrangement of carry signals from the lower order product array of FIG. 5.
Figure 9:
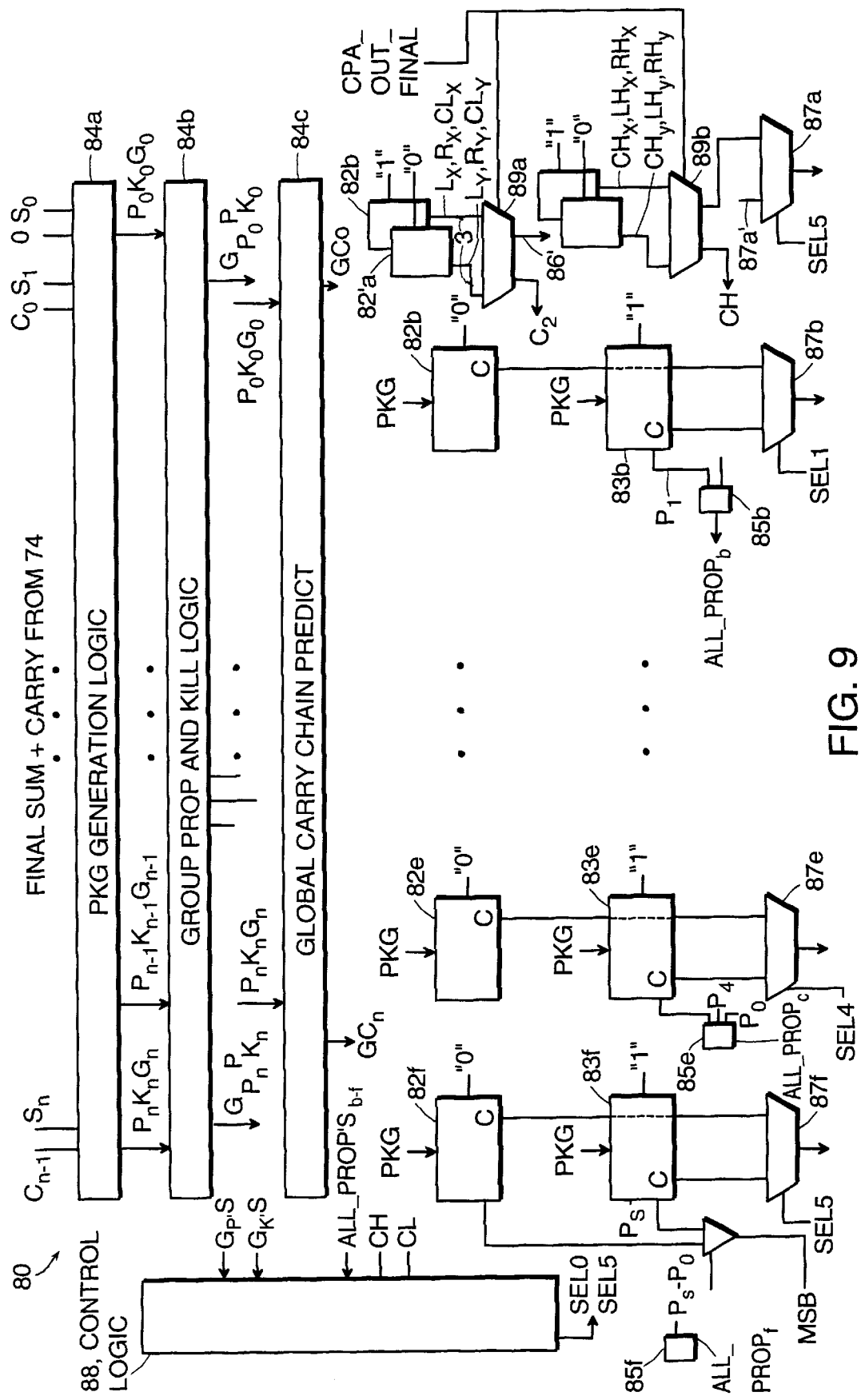
FIG. 9 is a block diagram of a rounding adder used in the portion of the multiply pipe of FIG. 4.

Round adder 80 as will be further described in conjunction with FIGS. 8 and 9, provides an addition result of the input operands by using a series of carry select adder sections. The round adder 80 includes carry select logic which can determine which adder section to select based upon considerations of the rounding mode, detection of a sticky bit, propagation of a carry as a result of the rounding operation and a global carry bit. The resulting sum or difference is rounded in accordance with the rounding mode of the floating point instruction. The rounding mode is provided via signals 91a provided from control logic 28e to 28f based upon the rounding mode call for by the instruction executed in the multiplier 32, and from the output of a sticky bit prediction circuit 103 via lines 103a.

Rounding adder 80 provides the rounded result in one cycle of pipe stage 37 using carry select adder sections and combinatorial logic to select correct rounded results for the LSB of the multiplication operation. The combinatorial logic provides select enable signals for each of the carry adder sections, to select the proper sum for each section in accordance with the rounding mode and result of the addition operation. The resulting fractional part of the round adder is concatenated with the exponent result normalized or not normalized to provide the result which is stored in the register file 21 as mentioned above.

As for the exponent portion of the mul pipe (stages 35b to 39b), the exponents of the operands are added and the extra bias (due to excess notation) are subtracted. A second exponent value is also calculated which is exp-1 for use if the round adder 80 indicates that a normalization shift is required i.e. the result is between ¼ and ½.

In operation, the multiplier 32 (FIG. 2) uses logic including adder 100 to determine borrows prior to or subsequent to a group to effectively determine for each grouping of the multiplier whether to use a copy of the multiplicand, shift the multiplicand by one or two, or use the 3X multiplicand, or zero, for the partial product corresponding to the multiplier grouping. The logic further includes a sticky bit detector 103 used to determine whether there are any non zero bits beyond the LSB of the result and initial partial product selectors 102 and 104 which in response to recode values from recode array 112 selects initial partial products for input to the multiplier array 110a. There is also shown a first row of the array comprised of adders 106 and 107 which operate respectively on the odd and even threads. TABLE I below lists the recoding for a Radix-8 algorithm.

TABLE I

| m3 | m2 | m1 | m | code value |
|----|----|----|---|------------|
|    |    |    | 0 |            |
| 0  | 0  | 0  | 0 | 0          |
| 0  | 0  | 0  | 1 | 1          |
| 0  | 0  | 1  | 0 | 1          |
| 0  | 0  | 1  | 1 | 2          |
| 0  | 1  | 0  | 0 | 2          |
| 0  | 1  | 0  | 1 | 3          |
| 0  | 1  | 1  | 0 | 3          |
| 0  | 1  | 1  | 1 | 4          |
| 1  | 0  | 0  | 0 | −4         |
| 1  | 0  | 0  | 1 | −3         |
| 1  | 0  | 1  | 0 | −3         |
| 1  | 0  | 1  | 1 | −2         |
| 1  | 1  | 0  | 0 | −2         |
| 1  | 1  | 0  | 1 | −1         |
| 1  | 1  | 1  | 0 | −1         |
| 1  | 1  | 1  | 1 | 0          |

The stage 2 includes the multiplier array 110. The multiplier array 110 includes the sign extend portion 110a, the booth recode or Radix 8 multiplier array 110b comprised of a plurality of carry save adders (not shown) and the lower order product contribution array 110c.

Array portion 110b has seven double rows of carry save adders in order to provide the odd and even threads. The array 110b provides the result of a multiplication of two floating-point operands by determining an even sum of nine partial products 0, 2, 4, 6, 8, 10, 12 and 16 and in parallel therewith, an odd sum of nine partial products 1, 3, 5, 7, 9, 11, 13, 15 and 17. The summations are performed in the carry-save adders (not shown). The summations are performed such that the results from the carry-save adders are an even sum, even carry, odd sum and an odd carry vectors which are the result of even-odd summations. The sum and carry vectors are then combined in combining stage 70 into two vectors which are finally combined in the half adder 74 and the rounding adder 80 with an appropriate rounding carry chain to produce the final product.

The nine sums for each thread requires seven rows of carry-save adders which are 3:2 counters in order to produce a sum for the thread comprised of a sum and carry vector. For an even thread, partial products, 0, 2 and 4 are added in the first row of carry-save adders. Partial product zero is shifted by twelve bit positions and partial product 2 is shifted by six bit positions in order to be added with partial product 4.

The shifting of these bit positions is necessary to provide the proper weights of the bit positions to add those products to partial product 4. The twelve LSBs of partial product 0 and six LSBs of partial product 2 are shifted right beyond the least significant bit of a carry-save adder for Row 1. The Row 1 even carry-saver adder combines the initial three even partial products into a sum vector and carry vector for row 1 (even) representing the sum of the partial product 0, 2 and 4. The row 1 sum vector is shifted right six bit positions, and the row 1 carry-save adder carry vector is shifted right five bit positions before combining with partial product 6 in row 2. The six LSBs of the sum vector, the five LSBs of the carry vector are shifted right beyond the least significant bit for row 2.

An additional five rows of carry-save adders are used to complete the even sum of partial products with six sum and five carry bits being shifted beyond the LSB of the array for rows 2 through 6, but even row 7 only 3 sum and 2 carry bits are shifted into LSB logic. The sum of the odd partial products is determined similarly to the even partial products mentioned above with LSBs in the partial products being shifted beyond the array with the exception of row 7.

Except for row 7, the output of each row shifts 6 LSBs of the sum and 5 LSBs of the carry to the lower order product logic. The LSB of the carry field is positioned 1 bit to the left and the LSB for the corresponding sum.

The array 110 further includes logic 110c to determine the contribution to the final result from the lower order product. The logic includes carry-save adders, half adders and appropriate carry chains to implement a portion of the lower order product in a manner that can be pipelined and not increase latency to obtaining the final answer. As mentioned above, the multiply array 110 implements a booth recoding algorithm, that is, the array multiplies three bits at a time in order to reduce the total number of partial products generated by the array, and thus, speeds up the multiplication operation as well as reduces the amount of adders necessary to determine the final result. The upper product portion of the array 110 (Radix 8 recode multiplier array 110b) however does not take into consideration contributions from the lower order product.

Referring now to FIG. 4A, the multiplier array 110 is shown in greater detail to include the sign extend prediction array 110a, the booth recode multiplier array 110b and the lower order product array 110c. The sign extend array 110a is used to predict the sign bits for bit positions in the multiplier array 110b vacated by shifting partial products bits towards the lower product array 110c. The booth recode multiplier array 110b here implements a 3 times multiplicand (Radix 8) booth recode algorithm which examines four bit positions of the multiplier at a time and covers or retires three bit positions of the multiplier. The lower order product array 110c examines the LSB's as they are shifted off of the booth recode multiplier array 110b to determine a contribution to the higher order product result from the lower order product without forming the product or having the booth recode multiplier array 110b provided for the entire width of the 2N bit product.

The booth recode multiplier array 110b includes seven double rows of carry save adders one row for odd partial product threads "O" and one row for even partial product threads "E". The first row is fed by initial partial products formed by examining the lower bit groups of the multiplier as is known and a third input from a product selection i.e. 0, ±2X, ±2X, ±3X or ±4X the multiplicand, as determined from the booth multiplier recoder 110b. Subsequent inputs to subsequent rows are provided from the carry and sum vectors from the preceding rows and a product selection (i.e. 0, ±1X, ±2X, ±3X or ±4X the multiplicand), as determined from the booth multiplier recoder 110*b*.

Fast Sign Extend of Sums and Carrys

Figure 5:
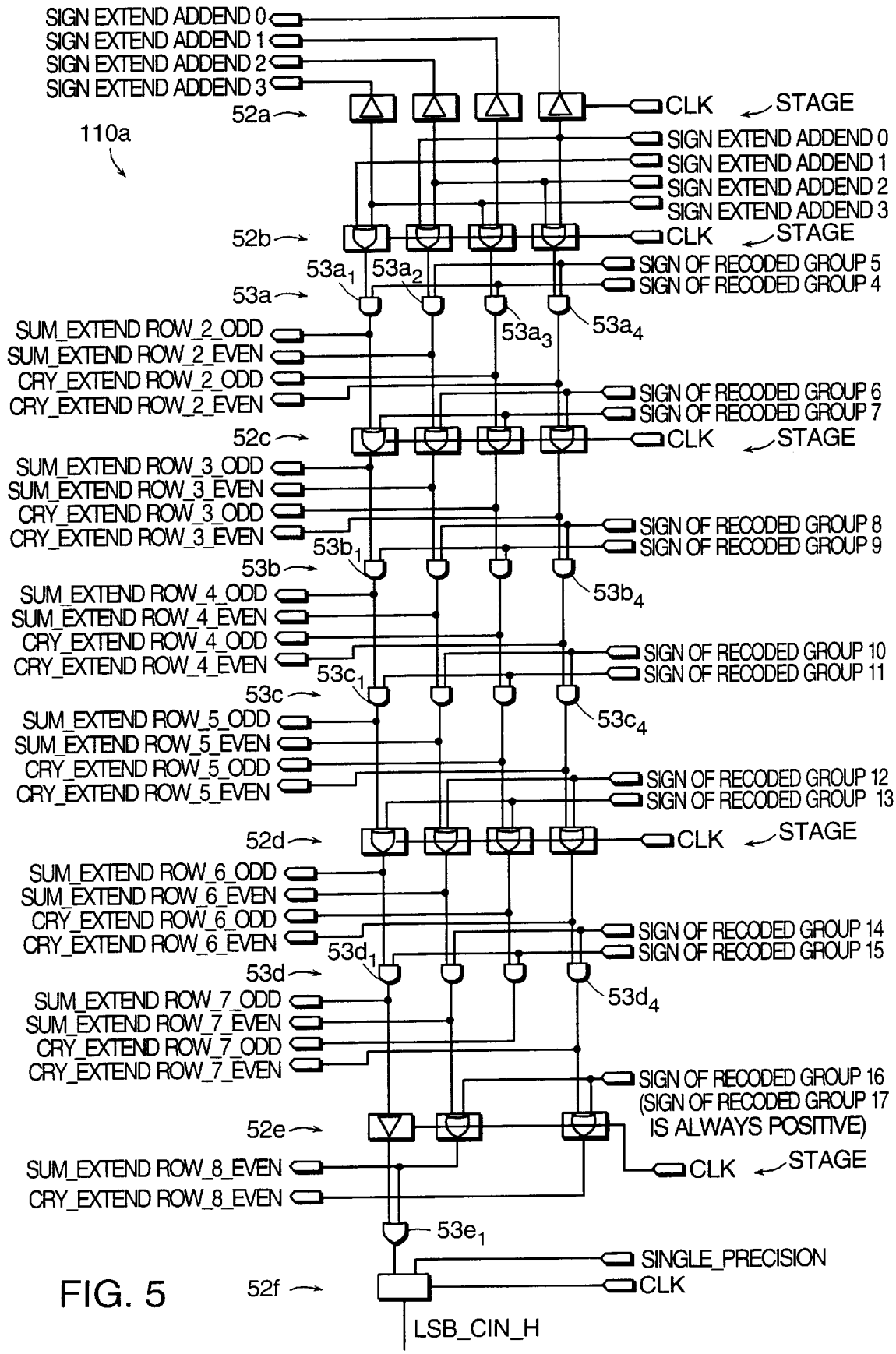
FIG. 5 is a block diagram of a circuit for providing a fast sign extend of partial products for a multiplier array of the multiplier of FIG. 4.

Referring now to FIG. 5, a logic network 50 used to determine a fast sign extend for the sum and carry vectors for each row of the multiply array 110*b* is shown. The logic network 50 implements two different algorithms to determine the fast sign extend. For sum vectors the sign extended bits are all zeros until a row of the array encounters a negative recode value. After a negative recode value is encountered, the sign bits are extended with "1's" for the remainder of the thread. That is, based upon the sign of the recode value the logic value of the sign extended bits can be determined.

The sign extend prediction for carry vectors is necessary when there are three partial products being summed in the initial row of the array 110. For the carry vectors the leading carry bits are predicted by a different rule. The leading carry bits are all "1's" until a non-negative recode is encountered. Thereafter, the leading carry bits are all "0's" for the remainder of the thread. For each thread of the array a msb_sum and an msb_cry is carried though the pipeline for each row. once msb_sum is set it will remain set for each subsequent row and once msb_cry is cleared it remains cleared for each subsequent row.

The logic network 50 is arranged to follow the pipeline stages of the multiply array 110*b*. The logic includes pairs of latches 52*a* to 52*f* which incorporate a logic function as illustrated (generally an "OR" for the sum vectors sign bits and an "AND" for the carry vector sign bits) corresponding to phases in the multiple pipe matched with that of the multiply array 110. Disposed between the latches are logic gate sets 53*a* to 53*e* to implement the above rule. Each of sets 53*a* to 53*d* include "OR" gates $53_{a1}$, $53_{a4}$ to $53_{b1}$, $53_{b4}$ for the sum vector sign and "AND" gates $53_{c1}$, $53_{c4}$ to $53_{d1}$, $53_{d4}$ for the carry vector signs. The last set $53_{e1}$, is comprised of an "OR" gate which is used to determine the LSB carry signal (LSB_CIN_H) for use in a rounding adder carry chain as will be described.

As an illustrative example the logic 50 includes the first set of latches 52*a* which incorporate a non-inverting buffer input (as shown by the buffer contained with the latch). The latches 52 a pass the sign bits of addends 0 to 3 to extend these addends i.e. the first four addends. These sign bits are logically combined at an input of a second set of latches 52*b* to form a first signal input ($S_{A1}$ or $S_{A3}$; $S_{A0}$ or $S_{A2}$) for the sum vectors ($S_{A1}$ & $S_{A3}$; $S_{A0}$ & $S_{A2}$) for the carry vectors. These signs for each vector are fed to the set of gates 53*a* which also receives the sign of the group 4 and 5 recodes to provide the sign extend for sum and carry vectors of the second and third rows for the even and odd threads. Similar logic devices are used to form the sign extend bits for subsequent rows of the array 110. The subsequent bits are based on the past state of the sign extend bit and the present state of the sign of the recode value such that if the sign bit of any sum vector is set to a logic 1 or if a negative recode is encountered all subsequent sum vector sign extend bits are set to a logic 1. Similarly, if any carry bits are reset to a logic 0 or a non-negative recode is encountered all subsequent carry vector sign extend bits are reset to a logic 0.

Referring now to FIGS. 6A to 6D a portion of the logic 110*c* used to examine 1sbs and determine a contribution from the lower order product to the final product is shown. The logic 110*c* is divided into a plurality of groups Group_0 to Group_8 with Group_0, Group_1, Group_7 and Group_8 being shown. Each of the groups are comprised of carry-save adders, half adders and appropriate carry chains. For example, Group_0 (FIG. 6A) which is used to evaluate product bits 0–5 shifted from the multiplier array 110*b* includes a carry-save adder 61 and a half adder 62 with a carry chain, 65.

Figure 6A:
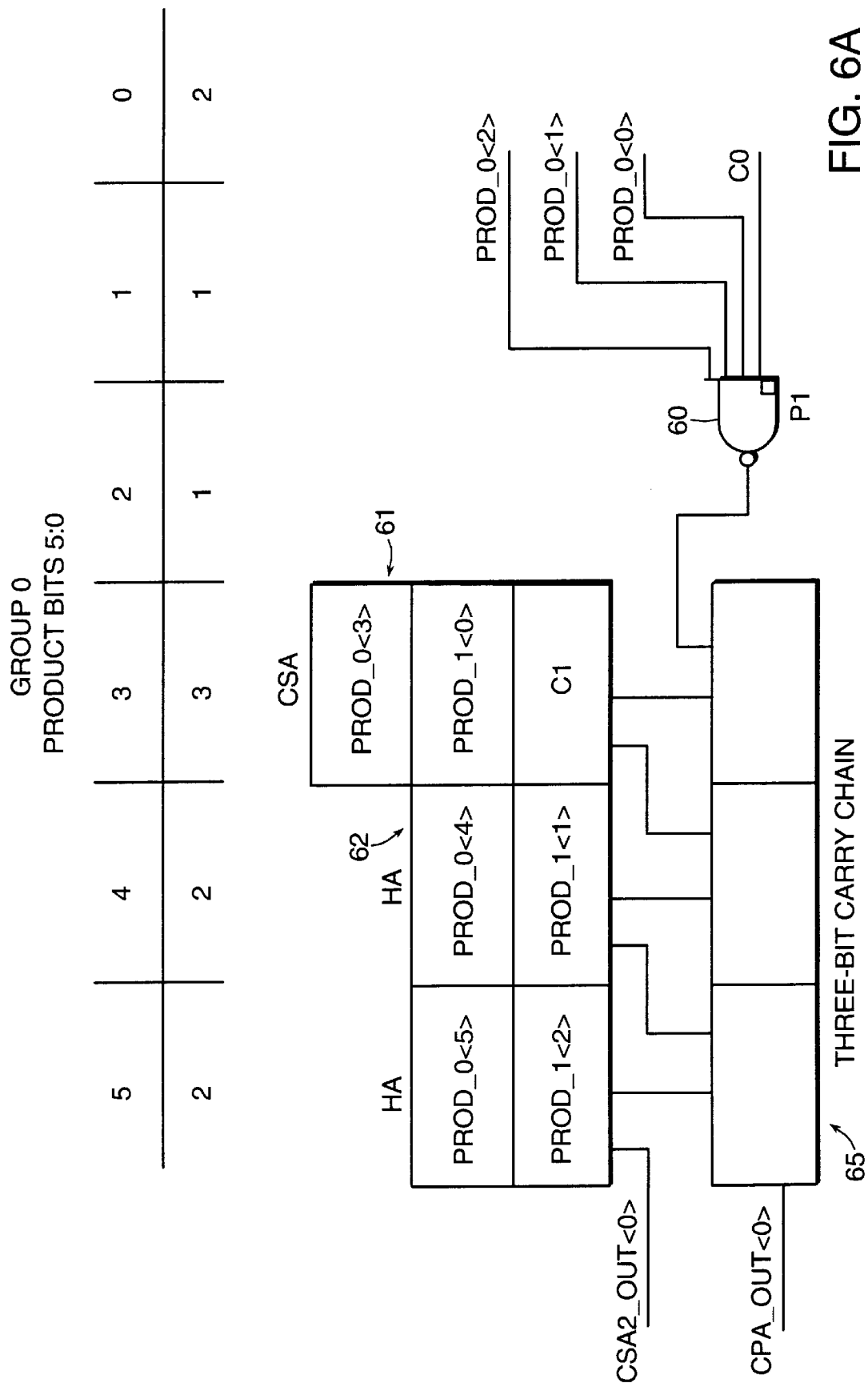
FIGS. 6A to 6D are block diagrams of portions of a lower order product array showing some of the stages used to determine contributions to a multiplication operation from lower order products.
Figure 6B:
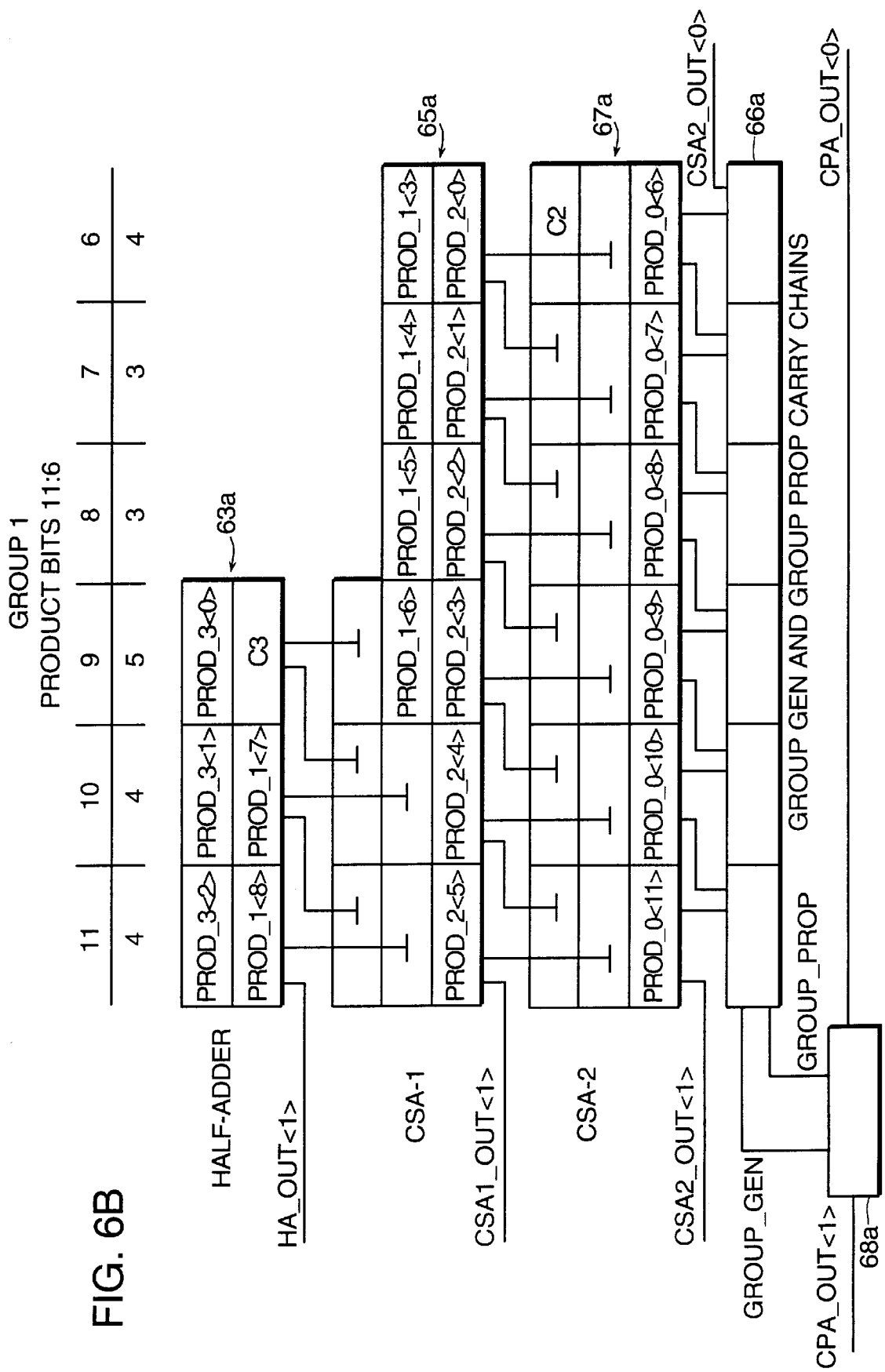

Similarly, as shown in FIG. 6B, for Group 1, the Group 1 chain includes a first carry-save adder 65*a* as well as a second carry-save adder 67*a* and a half adder 63*a* and a group propagation circuit 65*a* here a carry propagate adder which provides a carry for the subsequent group 7.

Group 7 is representative of the remaining Groups 2 through 7. The only significant difference being that for Groups 2 through 7, each of the product bit positions also includes a half-adder input as illustrated by half-adder 63*g*. That is, for Groups 2 through 7, there are six half-adders. Group 1 also includes a carry chain 66*a* as well as a carry propagate adder 68*a* which produces a carry propagate out to a succeeding group.

One of the results of the booth recoding used in the booth recode multiplier array 110*b* is that the partial product in a multiplier row can be either negative or positive. If the partial product is negative, a 2's complement representation of the partial product is needed to be computed or represented before the partial product is added to subsequent partial products. with the present arrangement, the 2's complement of the partial product can be determined by providing the 1's complement of the partial product, that is, inverting all the bits and adding a 1 in a least significant bit position of the partial product. Since the least significant bits for both odd and even partial products are shifted out of the array, the addition of the 2's complement bit is performed in the LSB logic without any additional overhead in hardware. The carry inputs where 2's complement add-ins are shown in FIGS. 6A to 6D are provided at the appropriate weighted bit positions. The number of inputs are each bit position of the full product is directly under the bit position column. Illustratively, bit position 9 contains five inputs. One from each of the first four partial products plus input CSP3, C3 the 2's complement carry input for partial product 3 while bit positions 10 through 50 contain at most four (4) new inputs. There is a maximum of four carry inputs into the n+2 most significant product bits.

As mentioned above, to determine the proper result for the final product, a potential contribution from the lower order product bits must be determined in a manner which is fast and suitable for pipelining. The n −2 LSB product bits are partitioned into 8 groups of six bits each and a final grouping of 3 bits. For Group 0, there will be a carryout of the bit 2 position only if partial product 0 bits 2:0 equal 111 and CO equals 1, the 2's complement carry for the partial product 0 so that only a 4 input gate 60 (FIG. 6A) is required to determine the carryout. Bit position 3 has 3 inputs and the 3 input to 2 output carry-save adder 61 is used. Since the carry output of a carry-saver adder at column 3 is added at bit position 4 only a 2 input to 2 output half adder 62 is needed for the two inputs for the columns 4 and 5. There are two carry outputs from bit position 5, one from the carry output of the half adder 62 for the column 5 inputs and one from the output of the 3-bit carry propagate adder 66 for bit positions 3, 4 and 5, as shown in FIG. 6A.

As shown in FIG. 6B, the logic for group 1 determines the sum of product bits 6 through 11 with the 2 carry inputs CSA2_OUT<0> and CPA_OUT<0> from group 0. There are 4 new partial product inputs with partial product bit positions 6 plus 2 carries from bit position 5. Signal CSA2_OUT<0> from group 0 is valid before carry propagate output CPA_OUT(<0> from group 0 since CSA2_

OUT<0> propagates only through a single half adder 62 while for CPA_OUT_(<0> out of group 0 to be valid, the Group 0 carry-save adder 61, half adder 62 and three-bit carry chain 66 (all FIG. 6A) have to be evaluated. Signal CSA2_OUT_<0> from Group 0 is summed in column 6 the first row of Group 1 along with the 4 new inputs for that column. Carry propagate adder output CPA_OUT_<0> from Group 0 is used in a look ahead circuit 68a to determine if carry propagate output from Group 1 should assert if there are all propagates in group 1 carry chain 66a and thus CPA_OUT_<1> has more time to become valid.

There are 5 new inputs at bit position 9, and 4 new inputs for the remaining bit positions 10 through 50. Starting at bit position 9, the half adder 63a and two levels of carry save adders 65a, 67a and a carry propagate adder 68a are used to reduce the five inputs plus two carry outputs from the carry saver adders at bit position 8. The four levels of half adder, two carry-saver adders and a carry propagate chain in bit position 9 produce four carry outputs into bit position 10. That is, a carry from the half adder 63 a, carry-save adder 65a, and a carry from carry-save adder 67a and a carry across the carry propagate carry chain 68a. The four levels of half adder, two carry-save adders and a carry propagate adder are continued for bit positions 10 through 50 with four new inputs and four carry inputs from the previous bit positions resulting in four carry outputs.

From bit position 10 through bit position 50, a repeated pattern of half adder, two carry-save adders and carry propagate adder carry chain are used. The logic is partitioned to six-bit groups which correspond to the multiplier array row from which the input has been shifted off the array 110b (FIG. 4A). odd sum bits and odd carry bits line up with the last three bits of the six bit group for the present row and the first three bit positions for the next row. Propagation of carry bits between groups is provided by routing the half-add carry output of a group to the carry-save adder one of the next section and the carry-save adder one carry output to carry-save adder 2 of the next section and the carry-save adder two carry output to the carry propagate carry chain of the next section.

A group propagate and a group generate are calculated for each group independent of the carry propagate adder output of the previous group. The carry propagate output for a group is asserted if the group generate is true or if the group propagate is true and there is a carry propagate from the previous group.

Figure 6C:
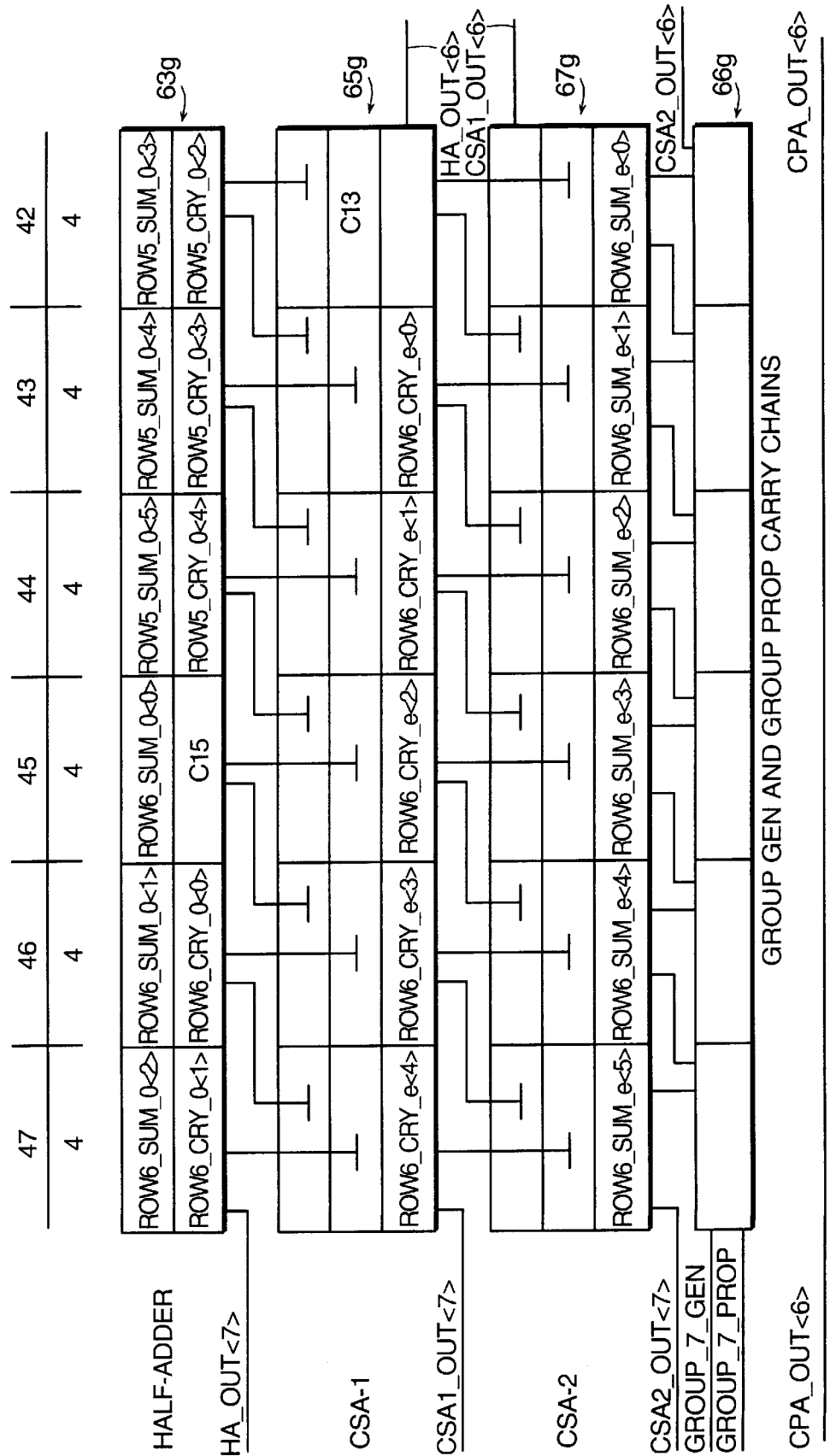

As shown in FIG. 6C, for Group 7, the carry propagate out CPA_OUT_<6> along with the group generate GROUP_7_GEN and the group propagate GROUP_7_PROP signals from group 7 are sent to the next group (GROUP 8, FIG. 6D) rather than being used to calculate a carry propagate carry for group 7. The logic for Groups 2 to 7 are similar to that shown for Group 7 in FIG. 6C which includes a half adder 63g and carry save adders 65g and 67g.

Figure 6D:
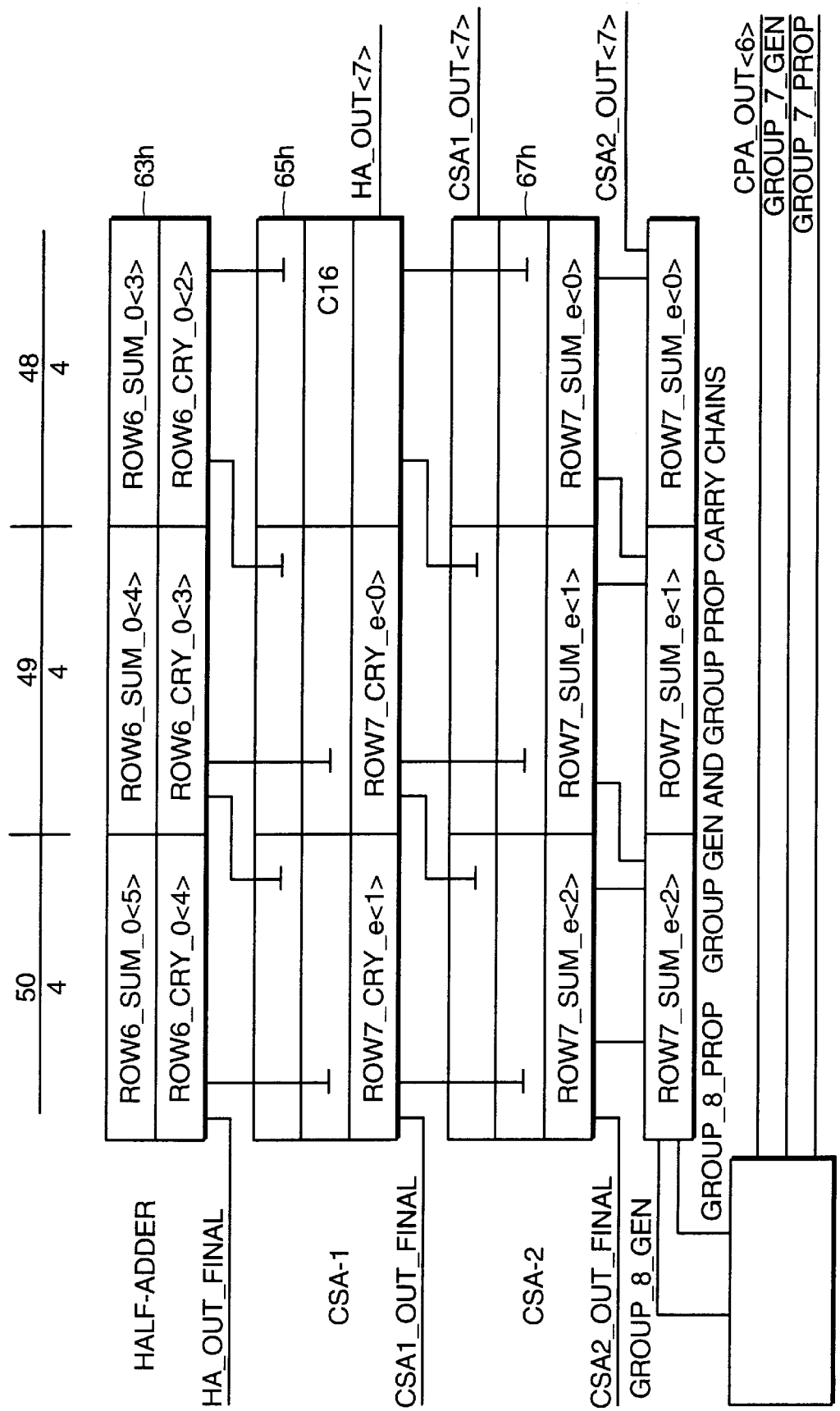

As shown in FIG. 6D, Group 8, the last group shown covers only three-bit positions 50:48. The four carry outputs which are added to the guard-bit position, bit 51 of the n+2 most significant product bits. As was shown in FIG. 6C, the alignment of the row 7 even-odd result vectors, is for the four-vector to two-vector reduction by use of the carry-save adders. The row 7 odd carry-out vector is left shifted by one before combining with the row 7 odd sum vector and the row 7 even sum vector which is right shifted by 3 is input to Group 8 carry-save adder 67g.

Figure 7:
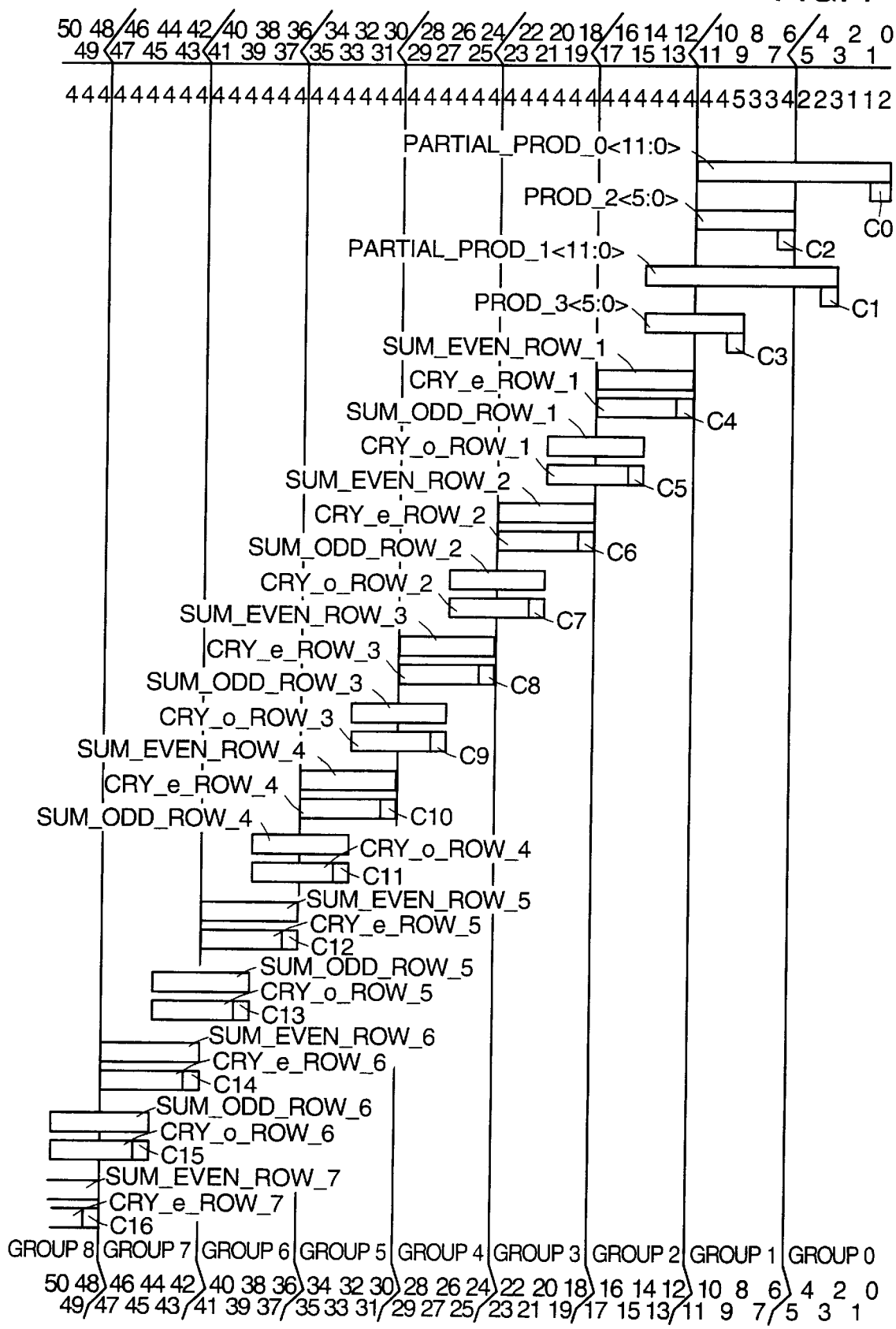
FIG. 7 is a diagram which shows mapping of bit positions to stages in the arrangements of FIGS. 6A to 6D.

Referring now to FIG. 7, the mapping of the lower order partial products is shown with all of the bits and the positions in which these bits are added in order to complete the lower order and last two bits of the full product for 53-bit fraction operand, that is, 51 bits. The mapping shows how each of the N–2 LSB product bits are determined and by which of the partial products.

Referring now to FIG. 8, summation of the final odd and even threads of the multiplier array 110b to provide a single sum and carry vector to the half-adder 74 includes a final combining stage 70 including carry save adders 71 and 72 fed by carry and sum vectors from the array 110b and the carry outs from the lower order array 110c. Carry save adder 70 is fed by HA_OUT_FINAL and is the earliest carry developed in Group 8 of the lower order product array (FIG. 6D). It is an input at the guard bit position of the first combining carry-save adder 71 in the space available by the left shifting of row 7 odd carry out vector. The input of the first combining carry-save adder 71 is the row 7 sum odd vector, row 7 carry odd vector left shifted by one bit position, and row 7 sum even vector which is right shifted three bit positions. The input of the second-combining carry-save adder 72 is the row 8 sum, row 8 carry and row 7 carry even vector which is right shifted two positions. The row 8 carry is left shifted by one position and provides a space for the carry CSA1_OUT_FINAL from the Group 8 carry-save adder 65h (FIG. 6D) to be input at the guard-bit position. The second combining carry-save adder 72 has two outputs designated "final sum" and "final carry". "Final sum" and "final carry" with final carry CSA2_OUT_FINAL (from FIG. 6D) left shifted by one bit position are provided as inputs to the half adder 74. The carry CSA2_OUT_FINAL from the Group 8 fills the space provided at the guard bit position by the left shift of the "final carry" vector. The n+2 most significant product bits in non-redundant form are provided from the round adder 80. Round adder 80 is fed the half add sum, and the half add carry left shifted by one bit position which provides a bit position for the carry output from the Group 8 carry chain CPA_OUT_FINAL to provide the rounded result.

Mul Pipe Rounding Adder

Referring now to FIG. 9, the rounding adder 80 in stage 3 of the mul pipe 33 is shown to include a first set of carry-select adder sections 81a, comprised of carry-select adder groups 82a–82f and a second set of carry-select adder sections 81b comprised of carry-select groups 83a–83f as shown. The rounding adder 80 further includes PKG generation logic 84a which on a bit by bit basis examines whether the $S_i$ and $C_{i-1}$ bits from the half adder 72 (FIG. 8) will generate, propagate or kill a carry. The PKG signals $P_i$, $K_i$, and $G_i$ for each bit position are fed to Group propagation and kill logic 84b. The group propagate logic 84b determines whether each adder group 82a–82f will kill or propagate a carry from the group and provides signals $G_p$ and $G_{Ki}$ for each group. The adder further includes a global carry chain logic circuit 84c which in response to signals $P_i$, $K_i$, and $G_i$ and signals $G_{Pi}$ and $G_{Ki}$ generate global carries i.e. look ahead carries for each group without regard to rounding. The global carries $G_{Ci}$ for each group are fed to control logic 88. The round adder further includes an ALL_PROP generation logic 85b to 85f which determines whether the internal propagation logic signals of the current adder group and all preceding groups propagate a carry, producing signals ALL_PROP$_0$ to ALL_PROP$_6$.

Here each of the group adders 82b–82f and 83b–83f are typically eight-bit adders (adders 82a and 82b are three bit adders which operate on the LRG bit positions) which are fed by the PKG signals on a bit by bit basis. The carry and sum outputs from the half adder 72 are fed to the inputs of the round adder with the $i^{th-1}$ sum bit position of the half adder and the $i^{th}$ carry bit position providing inputs for the $i^{th}$ bit position of the rounding adder 80. The outputs of each of the carry-select adder sections 82a–82f are coupled to one input of a corresponding bank of multiplexers 87a to 87f with the outputs of the second set b of carry-select adders 83a–83f coupled to a remaining input of the corresponding bank of multiplexers 83 as shown.

The first adder 82a and 83a in each of the set of adders 81a and b operate on the LRG bit positions of the operands for double precision floating point numbers. A similar set of adders here three bit adders 82e and 83e are provided for single precision floating point numbers for LRG and as the respective bits for double precision numbers. Thus, the bit groupings for the mul pipe round adder are 8, 8, 8, 3, 8, 7, 7, and 7.

The first set of carry-select adder sections 81a produce an add result which corresponds to a zero carry-in to each carry-select adder, whereas the second set b is used to provide a result which corresponds to a one at the carry-in of each carry-group adder 83a. That is, carry-select adder sections 81a provide a result without a carry input for the sections and carry-select adder sections 81b provide a result with a carry input.

The determination of which of the carry-select adder sections in each of the sets, 81a, 81b of carry-select adder groups is selected to provide bits to the output of the rounding adder 80 is determined in accordance with a control circuit 88. For sections A–F the carry select adder from set b is selected if there is a global carry into that section when adding the input operands from the half adder, or if by adding a 1 in the appropriate bit position (L, R. and G) a carry from rounding will be propagated to that section. The carry to a section which results from rounding is determined in circuit 88 by signals, CL and CH, MSB, MSB_N, and ALL_PROP.

The values of the carry signals CL and CH are not determined until the contribution from the lower order product is determined. Therefore, four cases of the values of CH and CL are determined. These values correspond to: 1) a value assuming rounding when a normalization shift is necessary, and the value of the contribution (CPA_OUT_FINAL) is zero; 2) a value assuming rounding when a normalization shift is necessary, and the value of the contribution (CPA_OUT_FINAL) is one; 3) a value assuming rounding when NO normalization shift is necessary, and the value of the contribution (CPA_OUT_FINAL) is zero; and 4) a value assuming rounding when NO normalization shift is necessary, and the value of the contribution (CPA_OUT_FINAL) is one.

The actual $C_L$ and $C_H$ are each determined by the final carry (CPA_OUT_FINAL) from the lower order product array 110c. If CPA_OUT_FINAL is 0 the X values of CL and CH are chosen whereas if it is 1 the Y values of CL and CH are chosen. Carry select adders 82a, 82a' determine $C_{LX}$, $C_{LY}$, assuming no carry in ("0") and a carry in ("1"). CPA_OUT_FINAL selects via mux 89a either the X or Y values. Carry select adders 82b, 82b' determine $C_{HX}$, $C_{HY}$, assuming no carry in ("0") and a carry in ("1") respectively. CPA_OUT_FINAL selects via mux 89b either the X or Y values. The adders 82a, 82a' and 82b, 82b' also determine values corresponding to $L_X$, $L_Y$, and $R_X$, $R_Y$. The final values of L and R are determined via mux 87a under control of signal SEL0.

For multiplication the fraction result from the round adder 80 is between ¼ and ½ or ½ and 1. Signal MSB_N is asserted when a fraction result falls within the lower bound and signal MSB is asserted when a fraction result falls within the upper bound. The position to insert the rounding bit is not known when the round add is started. The proper bit position to round can be either of two possibilities. For fraction results in the lover range the round bit is inserted at a 1 bit less significant bit position than results in the upper range. Two carry outputs of the K bit position are determined by round adder 80, CL inserting the round for the lower range and CH inserting the round for the upper range of the fraction result. If each bit position more significant that the L bit to the input bit of a section is a propagate, and there is a carry due to rounding at the L bit position ((CL & MSB_N) or (CH & MSB)), a carry into that section due to rounding is determined.

The control circuit has as inputs signals ALL_PROP$_0$ to ALL_PROP$_5$ which are determined from the propagate signals internal to the adders by logic circuits 85b to 85f. PKG logic 84a is disposed between the rounding adder and the half adder, and is fed by the half adder sum ($S_i$) and carry ($C_{i-1}$) signals on a bit by bit basis. The PKG logic 84a determines whether at each bit position a kill carry, a propagate carry or a generate carry is provided. That is the PKG logic determines carries at the bit or local level providing signals $P_i$, $K_i$ and $G_i$. These signals are fed to a group detection logic 84b which produces signals $G_P$ and $K_P$ which determine whether the adder groups 82a to 82f and 83a to 83f will kill or propagate a carry from the group. These signals which are fed to the control logic 88 are used to generate the output signals from the control logic 88.

Suffice it here to say that the control circuit 88 provides select-enable signals to each of the multiplexers 87a–87g to select at the output thereof either results provided from selected ones of the carry-select adder sections in set 81a or selected ones of carry-select adder sections in set 81b.

The rounding adder 80 thus uses the properties of a carry-select adder with a single section select to perform a combined result/rounding addition in the single phase of the mul-pipe cycle. The least significant three bits of the addition are designated as the L bit, which is the least significant bit of the fraction, the R bit or the round bit which is one bit less significant than the L bit and the G bit or guard bit which is one bit less significant than the R bit. Rounding occurs in these positions by selective injection of a bit in one of the positions in accordance with the rounding mode and the values of signals fed to the control logic. This addition is determined for either single precision or double precision operations using the half adder disposed in the single precision or double precision positions.

Rounding is accomplished in one of three different modes: NML (normal), INF (infinity), or chop. The positions and values where a round bit is added are shown below in TABLE 1 for each of the modes.

TABLE 1

| Round Mode Flow | L | R | G |
|---|---|---|---|
| NML low | | | +1 |
| NML high | | +1 | |
| INF low | | +1 | |
| INF high | +1 | | |
| CHOP low | | +0 | |
| CHOP high | | +0 | |

The selection of the round mode flow used is determined from the rounding mode specified for the instruction, the sign of the result and the results of the sticky bit logic detection. For the NML mode, the value of bits L R and G and the carry out at the L-bit position rounded at the G bit and the value of L R and G and carry out rounded at the R bit are determined.

The NML mode is used with VAX® (Digital Equipment Corp.) rounding or IEEE RNE (round to nearest even) rounding. For normal rounding the guard bit G position represents the actual round bit if the result is less than one-half which requires a left shift to normalize, and the R bit position is the actual round bit if the result is between one-half and one where no normalization shift is necessary.

The INF flow is used for infinity rounding if the result is sticky to the R bit position (STICKY_TO_R is asserted), for positive results rounding to infinity and for negative results rounding to minus infinity.

The chop flow is the default flow when the final result is not to be incremented at the G, R, or L bit positions because of rounding. Control lines specifying the flow are asserted at the start of the round add in the multiple pipe. The control lines and the signals on the control lines are determined from instruction type during decoding of the floating-point instruction, sign of the result, and the result of the sticky bit calculations. An illustrative example is shown in TABLE II.

Figure 10:
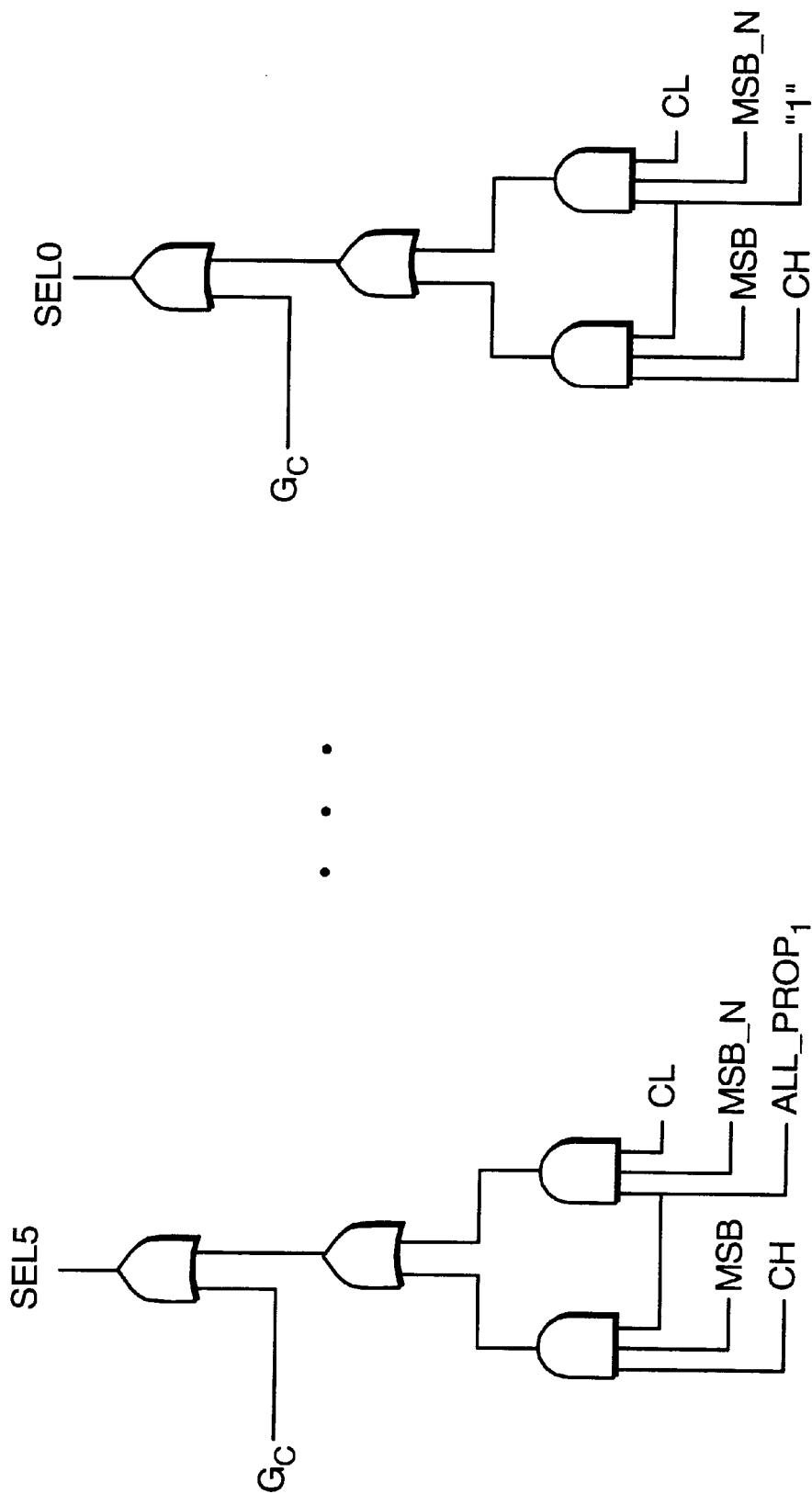
FIG. 10 is a block diagram of control logic used in the rounding adder of FIG. 9.

Referring now to FIG. 10 the control logic to provide the select signals for the multiplexers 87a to 87f is shown. The control logic 88 is responsive to the signals from the group detection propagation logic 84b which determines group or section propagates as well as group or section kills.

The control logic further includes a global carry chain logic 84c which is used to determine carries from the group propagation and group kill logic. In addition the control logic includes combinatorial logic which is responsive to the MSB of the result, carry signals from the LRG adder, and ALL_PROP signals from the propagation logic.

As shown in particular in FIG. 9, the control logic implements the following logic equation $(G_C+((C_H\cdot MSB)+(C_L\cdot MSB\_N)$ for the first stage and for subsequent stages $(G_C+((C_H\cdot MSB\cdot ALL\_PROP) + (C_L\cdot MSB\_N\cdot ALL\_PROP)$. In a preferred embodiment push-pull cascode logic is used to implement the multiplexer function 87a, 87f in response to the logic equivalent of the above signals. This type of logic can be used elsewhere in the circuits if desired.

Thus $C_L$ and $C_H$ for the L, R, G bits are determined as well as the result L and R bits for low rounding and the L bit for high rounding. Since the L, R, G sum prior to addition of a round bit is formed from the outputs of the half adder, 74, the maximum sum possible is 1 011 (11) in base 10. The sum of L,R, G plus a round at the K bit position is 1 111 (15) which is less than 16 so only one carry out of the L, R, G section occurs from the addition of the input, sum, carry and round values. In general, the half adder is needed for implementation of the IEEE rounding modes. The adder is used to propagate a carry out of the LRG positions which can occur with the IEEE modes. With other modes it may not occur and thus the half adder can be eliminated. Alternatively, the carry chain logic could be more complex to handle the additional carry and thus eliminate the need for the half adder.

The MSB of the result is determined without the effects of rounding. If the result prior to rounding is less than one-half for effective subtraction, or less than one for add-type of instructions, then the L, and R low value and low carry out of a L bit position are selected to complete the rounding operation; otherwise, the L high value is chosen. CL and CH are determined with look-ahead logic which is separate from the L, R, G additions. The lookahead carry logic first determines if the sum of the sum and carry inputs to the R, G and L bit positions is 3 or greater, 4 or greater, 5 or greater, 6 or greater or 7 or greater.

The possible round carries are then determined from the round mode.

| | | |
|---|---|---|
| COUT_low_noCIN<L> | = | (7_or_Greater AND NML) OR (6_or_Greater AND INF) ; |
| COUT_low_CIN<L> | = | (7_or_Greater) OR (6_or_Greater AND NML) OR (5_or_Greater AND INF) ; |
| COUT_high_noCIN<L> | = | (6_or_Greater AND NML) OR (4_or_Greater AND INF) ; |
| COUT_high_CIN<L> | = | (7_or_Greater) OR (5_or_Greater AND NML) OR (3_or_Greater AND INF ; |

CL and CH are thus "don't cares" when there is a carry out in the L bit position prior to rounding as the group following the L bit already selects the high result without rounding.

If there is a carry out from the L, R, G section of the round adder as the result of adding just the input sum and carry bits, then the bits beyond the L, R, G section are not modified further due to rounding since the global carry signal will already be asserted if each bit position more significant than the L bit till the input bit of a section is a propagate. Each carry-select section, therefore, simply follows the carry in for that section without rounding included.

However, if there is no carry out of L, R, G section of the round adder as a result of adding just the input sum and carry bits and the CL =1 & MSB_N or CH equals 1 and MSB then the carry out of the L bit position (COUT <L>) for the selected L, R, G rounding mode is a 1 and further adjustment of the final rounded result is required. The first carry-select section 82a, just beyond the L bit, is switched to select its sum assuming the carry input is to be asserted. The next carry-select section 82b is switched to the sum assuming a carry, when COUT<L> is asserted as a result of rounding and every bit of section 82a is a propagate. Section 82c is switched to select the sum for a carry input if COUT<L> is asserted as a result of rounding and every bit of section 82a and section 82b are propagates. That is, each section switches to the sum assuming a carry input when the group propagates for all less significant sections to the L bit are asserted and there is a carry out of a L bit as a result of rounding.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

| | | | | | | | RLG |
|---|---|---|---|---|---|---|---|
| OP_A | 0.0010101 | 10010101 | 01010101 | 01010101 | 01010101 | 01010101 | 0101 |
| OP_B | 0.0101010 | 10101010 | 10101010 | 00101010 | 10101010 | 10101010 | 1010 |
| | | | | | | | 1 |
| group $C_{in}$ | | 1 | 0 | 0 | 0 | 0 | 0 |

-continued

| group Prop | 0 | 1 | 0 | 1 | 1 | | |
|---|---|---|---|---|---|---|---|
| adder sections FIG. 9 | 82f | 82e | 82d | 82c | 82b | 82a | |
| sections w/o cy | 0.0111111 | 00111111 | 11111111 | 01111111 | 11111111 | 11111111 | |
| adder sections FIG. 9 | 83f | 83e | 83d | 83c | 83b | 83a | |
| sections w/ cy | 0.1000000 | 01000000 | 00000000 | 10000000 | 00000000 | 00000000 | 0000 |
| results w/o rnd | 0.1000000 | 00111111 | 11111111 | 01111111 | 11111111 | 11111111 | 1111 |
| results rounding | 0.1000000 | 00111111 | 11111111 | 10000000 | 00000000 | 00000000 | 0000 |

What is claimed is:

1. A computer apparatus multiplying a pair of floating point numbers, each floating point number formed of a fractional portion and an exponent, the apparatus comprising:
   a booth recode multiplier array receiving the fractional portions of the pair of floating point numbers, said array having a plurality of rows, each row having a sum and carry vector for determining partial products;
   a lower order product array having a row corresponding to each row of the multiplier array, said lower order product array responsive to the multiplier array to determine a contribution to a multiplication result from a lower order product; and
   a final product adder logic responsive to said booth recode multiplier array and said lower order product array, said final product adder logic providing a final multiplication product.

2. The apparatus of claim 1 wherein the final product adder logic includes:
   a combining logic coupled to receive the sum and carry vector from a respective row of said multiplier array and bits from a corresponding row of said lower order product array corresponding to a contribution to the final product, said combining logic combining the sum and carry vector and said bits.

3. The apparatus of claim 1 wherein the lower order product array comprises:
   a half adder receiving shifted corresponding product bits from the multiplier array, said half adder producing sum and carry bits;
   a pair of carry-save adders coupled to receive the carry and sum bits from the half adder, said pair of carry-save adders producing a sum and carry vector for the corresponding row of the multiplier array; and
   a carry chain logic fed by a carry out for one of said rows preceding a last one of said rows, said carry chain combining a last one of the sum and carry vectors corresponding to a last one of the rows of the multiplier array to provide the contribution to the multiplication product from the lower order product.

4. The apparatus of claim 1 wherein said multiplier array produces partial products in a manner independent of contributions from the lower order product array.

5. An apparatus for determining a contribution to a multiplication result from a lower order product, comprising:
   a multiplier array having a plurality of rows; and
   a half adder receiving shifted corresponding bits from the lower order product;
   a pair of carry-save adders coupled to receive shifted bits from the lower order product and output bits from the half adder, said carry-save adders producing a sum and a carry vector for the corresponding row of the multiplier array; and
   a carry chain logic coupled to receive a carry out for one of said rows preceding a last one of said rows, said carry chain logic combining a last one of the sum and carry vectors corresponding to a last one of the rows of the multiplier array to provide the contribution to the multiplication result from the lower order product.

6. The apparatus of claim 5 wherein said carry chain logic produces signals corresponding to a group propagate carry and a group generate carry.

7. The apparatus of claim 6 wherein said carry chain logic is responsive to a group propagate and a group generate of a preceding row of the multiplier array.

8. The apparatus of claim 7 wherein said half adder of a last one of the rows of the array produces an output bit corresponding to one bit of contribution of a final product from the multiplier array.

9. The apparatus of claim 7 wherein said carry-save adders of a last one of the rows of the array produces two output bits corresponding to two bits of contribution of a final product from the multiplier array.

10. A multiplier array apparatus for determining a contribution to a multiplication result from a lower order product, for each row of a corresponding multiplier array, the apparatus comprising:
   an adding logic receiving shifted bits from the array, the adding logic producing a sum and carry vector for the corresponding row of the multiplier array; and
   a carry chain logic coupled to receive a carry out from the adding logic corresponding to one of said rows of the array preceding a last one of said rows of the array, the carry chain logic combining a last one of the sum and carry vectors corresponding to a last one of the rows of the multiplier array to provide the contribution to the multiplication result from the lower order product.

11. In a computer system including:
   a central processing unit;
   a memory connected to the processing unit by a processor bus; and
   a floating point logic in the central processing unit comprising an apparatus for multiplying a pair of floating point numbers, each floating point number formed of a fractional portion and an exponent, the apparatus comprising:
   a booth recode multiplier array responsive to fractional portions of the pair of floating point numbers, said array having a plurality of rows for determining in each row partial products;
   a lower order product array having a row corresponding to each row of the multiplier array, said lower order product array responsive to bits from the multiplier array to determine a contribution to a multiplication result from a lower order product; and
   a final product logic responsive to said booth recode multiplier array and said lower order product array, said final product logic providing a final product.

12. The apparatus of claim 11 wherein the final product adder logic includes:

a combining logic coupled to receive the sum and carry vector from a respective row of said multiplier array and bits from a corresponding row of said lower order product array corresponding to a contribution to the final product, said combining logic combining the sum and carry vector and said bits.

13. The apparatus of claim 11 wherein the lower order product array comprises:

a half adder receiving shifted corresponding product bits from the multiplier array, said half adder producing sum and carry bits;

a pair of carry-save adders coupled to receive the carry and sum bits from the half adder, said pair of carry-save adders producing a sum and carry vector for the corresponding row of the multiplier array; and a carry chain logic fed by a carry out for one of said rows preceding a last one of said rows, said carry chain combining a last one of the sum and carry vectors corresponding to a last one of the rows of the multiplier array to provide the contribution to the multiplication product from the lower order product.

14. The apparatus of claim 11 wherein said multiplier array produces partial products in a manner independent of contributions from the lower order product array.

15. The apparatus of claim 11 wherein said carry chain logic produces signals corresponding to a group propagate carry and a group generate carry.

16. The apparatus of claim 15 wherein said carry chain logic is responsive to a group propagate and a group generate of a preceding row of the multiplier array.

17. The apparatus of claim 16 wherein said half adder of a last one of the rows of the array produces an output bit corresponding to one bit of contribution to the final product from the multiplier array.

18. The apparatus of claim 16 wherein said carry-save adders of a last one of the rows of the array produces two output bits corresponding to two bits of contribution to the final product from the multiplier array.

\* \* \* \* \*